United States Patent
Kaneko et al.

(10) Patent No.: US 10,384,104 B2
(45) Date of Patent: Aug. 20, 2019

(54) GOLF CLUB SHAFT

(71) Applicant: Mitsubishi Chemical Corporation, Chiyoda-ku (JP)

(72) Inventors: Takashi Kaneko, Toyohashi (JP); Hiroyasu Kikawa, Toyohashi (JP); Satoshi Shimono, Toyohashi (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 6 days.

(21) Appl. No.: 15/517,432

(22) PCT Filed: Oct. 8, 2015

(86) PCT No.: PCT/JP2015/078619
§ 371 (c)(1),
(2) Date: Apr. 6, 2017

(87) PCT Pub. No.: WO2016/056624
PCT Pub. Date: Apr. 14, 2016

(65) Prior Publication Data
US 2018/0221731 A1  Aug. 9, 2018

(30) Foreign Application Priority Data

Oct. 8, 2014 (JP) .................................. 2014-206926
Oct. 8, 2014 (JP) .................................. 2014-206927
Oct. 8, 2014 (JP) .................................. 2014-206928

(51) Int. Cl.
  *A63B 53/10*  (2015.01)
  *B32B 5/12*  (2006.01)
  (Continued)

(52) U.S. Cl.
  CPC ................ *A63B 53/10* (2013.01); *B32B 5/12* (2013.01); *B32B 5/26* (2013.01); *A63B 60/42* (2015.10);
  (Continued)

(58) Field of Classification Search
  CPC ...... A63B 53/10; A63B 60/42; A63B 2102/32; A63B 2209/023; B32B 5/12; B32B 5/26; B32B 2262/106
  See application file for complete search history.

(56) References Cited

U.S. PATENT DOCUMENTS 6,213,888 B1 * 4/2001 Kawaguchi ........ A63B 24/0003
                                                    473/223
6,273,830 B1 * 8/2001 Takemura ............. A63B 53/10
                                                    473/319
(Continued)

FOREIGN PATENT DOCUMENTS

JP        9-239082 A        9/1997
JP     2000-37486 A        2/2000
(Continued)

OTHER PUBLICATIONS

International Search Report dated Dec. 28, 2015 in PCT/JP2015/078619 filed Oct. 8, 2015.
(Continued)

*Primary Examiner* — Stephen L Blau
(74) *Attorney, Agent, or Firm* — Oblon, McClelland, Maier & Neustadt, L.L.P.

(57) ABSTRACT

Provided is a fiber-reinforced golf club shaft with small cantilever bending displacement despite its light weight, and provided to exhibit a longer carry distance while showing excellent ball flight patterns regardless of the skills of a golfer. The golf club shaft configured to have a plurality of fiber-reinforced plastic layers made of resin and a fiber material, comprising: wherein formula (1) below is satisfied when the length of the golf club shaft is set as "L" (mm), the weight as "W" (g), and the displacement as "D" (mm) that is observed when a cantilever bending test is conducted by exerting a predetermined load in the vicinity of the tip end while supporting the butt end to measure the displacement at the tip end.

$$455 \leq D+7.5 \times W \times (1168/L) \leq 515 \quad (1)$$

10 Claims, 14 Drawing Sheets

(51) Int. Cl.
*B32B 5/26* (2006.01)
*A63B 102/32* (2015.01)
*A63B 60/42* (2015.01)

(52) U.S. Cl.
CPC ..... *A63B 2102/32* (2015.10); *A63B 2209/023* (2013.01); *B32B 2262/106* (2013.01)

(56) References Cited

U.S. PATENT DOCUMENTS

| | | | |
|---|---|---|---|
| 6,773,358 B1* | 8/2004 | Sumitomo | A63B 53/10 473/319 |
| 7,524,248 B2* | 4/2009 | Kumamoto | A63B 53/10 473/319 |
| 8,491,410 B2* | 7/2013 | Kato | A63B 53/10 473/319 |
| 9,119,994 B2* | 9/2015 | Nakamura | A63B 53/10 |
| 9,387,378 B2* | 7/2016 | Shimono | A63B 60/00 |
| 10,004,960 B2* | 6/2018 | Shimono | A63B 53/10 |
| 2003/0176237 A1* | 9/2003 | Oyama | A63B 53/10 473/319 |
| 2007/0298902 A1 | 12/2007 | Hasegawa | |
| 2012/0071266 A1 | 3/2012 | Rice et al. | |
| 2012/0295730 A1* | 11/2012 | Hasegawa | A63B 60/42 473/292 |
| 2014/0038745 A1 | 2/2014 | Abe | |
| 2015/0157906 A1 | 6/2015 | Shimono et al. | |
| 2015/0297963 A1 | 10/2015 | Shimono et al. | |
| 2015/0328507 A1* | 11/2015 | Nakamura | A63B 53/10 473/292 |

FOREIGN PATENT DOCUMENTS

| | | |
|---|---|---|
| JP | 2004-33667 A | 2/2004 |
| JP | 2007-203115 A | 8/2007 |
| JP | 2008-5913 A | 1/2008 |
| JP | 2009-22622 A | 2/2009 |
| JP | 2014-27973 A | 2/2014 |
| WO | WO 2013/180098 A1 | 12/2013 |
| WO | WO 2014/034803 A1 | 3/2014 |

OTHER PUBLICATIONS

Japanese Office Action dated Dec. 4, 2018 in Japanese Patent Application No. 2017-211185 (with unedited computer generated English translation).

Japanese Office Action issued in Japanese Patent Application No. 2017-211185 dated Jun. 18, 2019 (w/ English Translation).

* cited by examiner

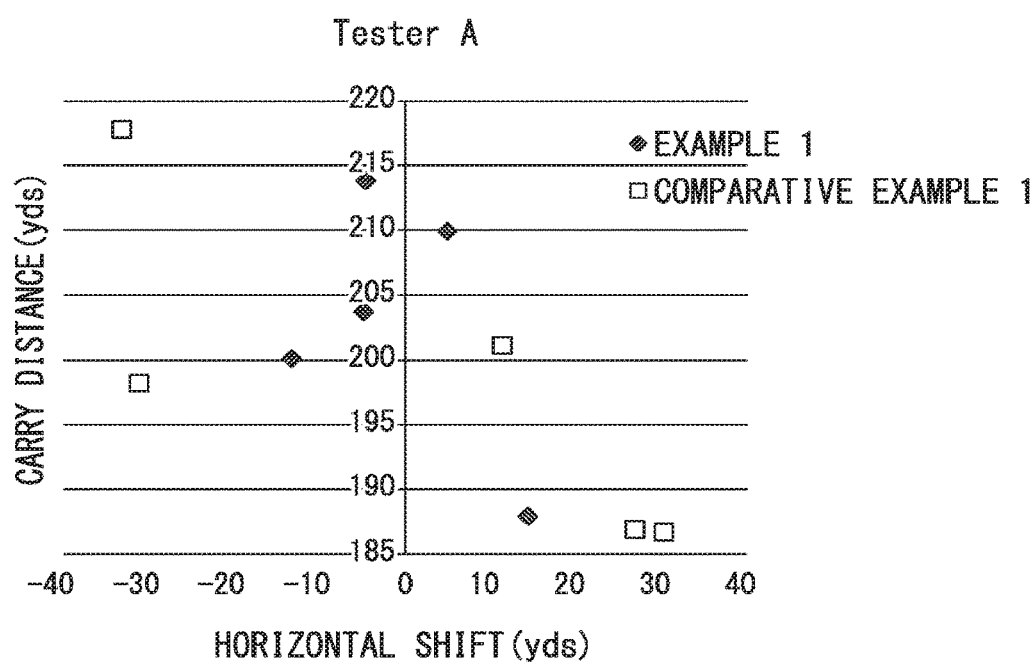
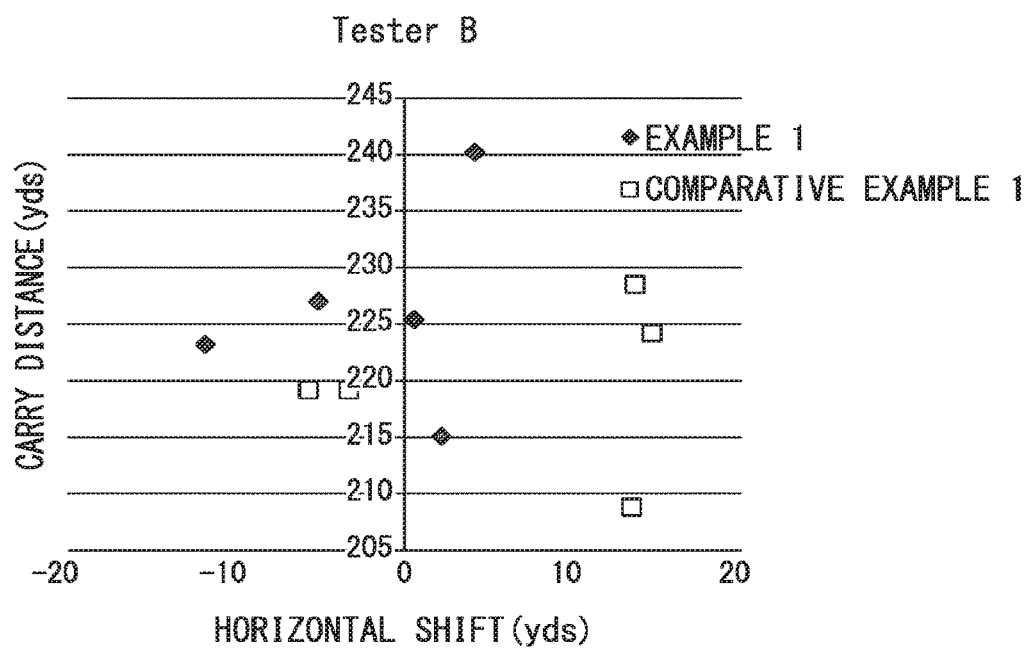

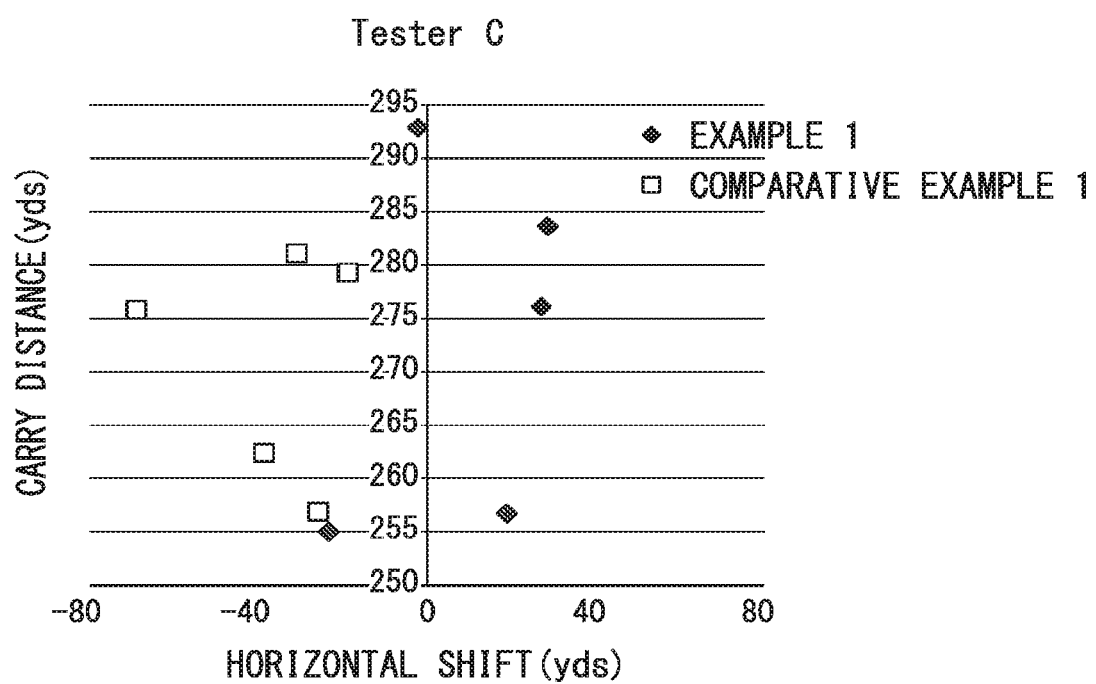

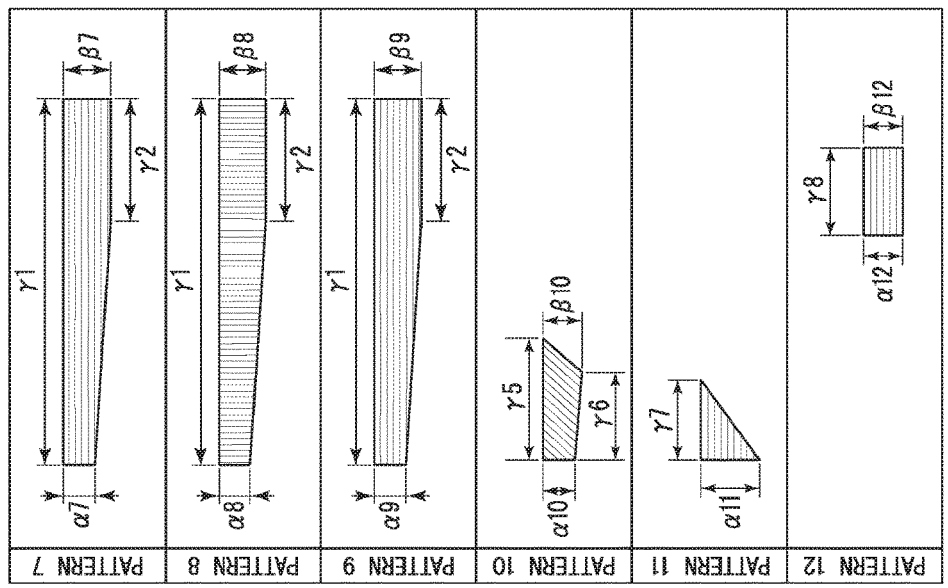
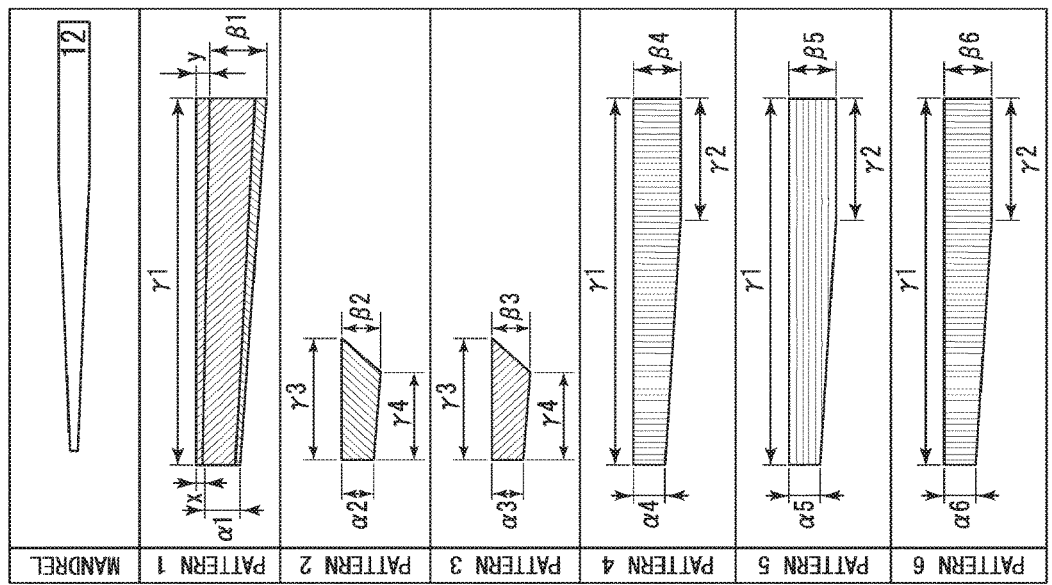
FIG. 10

FIG. 12
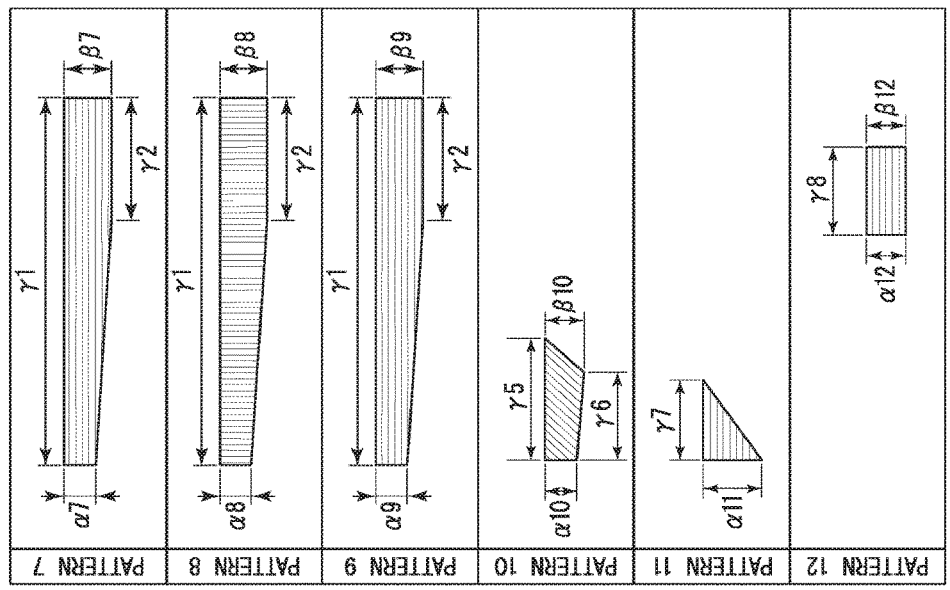
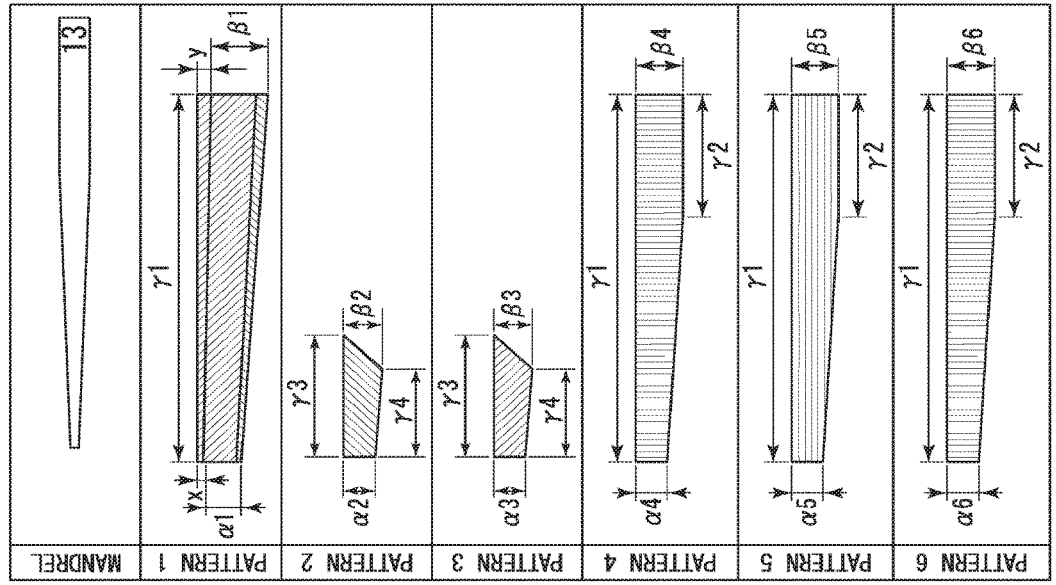

GOLF CLUB SHAFT

TECHNICAL FIELD

The present invention relates to a golf club shaft made by using a fiber-reinforced plastic, especially to such a golf club shaft that exhibits a longer carry distance and excellent ball flight patterns regardless of the skills of a golfer, because the shaft has high bending stiffness despite its light weight.

BACKGROUND ART

Since fiber-reinforced plastics are lightweight and have excellent strength properties, they are widely used in the manufacture of golf club shafts. When playing golf, it is known that lightweight golf clubs, especially lightweight golf club shafts, contribute to significantly increasing swing speed, which in turn brings about a remarkable extension of carry distance derived from an increase in energy generated by acceleration of head speed.

However, while a lightweight golf club shaft accelerates swing speed, it reduces swing stability due to a decrease in the moment of inertia of the golf club, and the ball flight patterns become unstable accordingly. Moreover, a conventional golf club shaft made of fiber-reinforced plastic is set to be lightweight by reducing the thickness of a fiber-reinforced plastic layer, called a straight layer, in which the fiber material is aligned in the longitudinal direction of the shaft, or by reducing the number of straight layers. When such a shaft is used, the flex, an indicator to show the stiffness of a shaft, becomes soft. A shaft with a soft flex may be able to increase the swing speed even with less force. However, for a golfer capable of gaining faster head speed, swing stability at the time of impact may be reduced, thus further negatively affecting ball flight patterns.

Patent Literature 1 discloses a golf club shaft, made to be as lightweight as possible by laminating a fiber-reinforced plastic layer, called a hoop layer, where a fiber material is aligned to be perpendicular to the longitudinal direction of the shaft, and by optimizing its location. However, to achieve as lightweight a shaft as possible, the thickness of a straight layer or the number of straight layers needs to be reduced, thus providing no solution for the above-identified problems.

Patent Literature 2 discloses a golf club having a twist strength enhanced by setting a thickness of no greater than 0.06 mm for a prepreg sheet to be used for a fiber-reinforced plastic layer, called a bias layer, where a fiber material is aligned diagonally to the longitudinal direction of the shaft. However, since a shaft of such a golf club requires two hoop layers to achieve reinforcement in the circumferential direction, it is necessary to reduce the thickness of a straight layer or the number of straight layers so as to obtain a lightweight shaft. Accordingly, no solution is provided for the above-identified problems.

Meanwhile, Patent Literature 3 discloses a lightweight golf club shaft capable of enhancing head speed, formed by arranging the hoop layer only in a region located at 45% of the entire length from the butt end. The head speed is improved by using such a lightweight shaft. However, for a golfer capable of accomplishing faster head speed, a problem of lowered swing stability is not sufficiently solved.

CITATION LIST

Patent Literature

Patent Literature 1: WO/2013/180098
Patent Literature 2: JP2007-203115A
Patent Literature 3: JP2009-22622A

SUMMARY OF THE INVENTION

Problems to be Solved by the Invention

The present invention was carried out to solve the aforementioned problems. Its objective is to provide a lightweight golf club shaft which is capable of providing high swing stability, showing excellent ball flight patterns regardless of the swing speed of a golfer, and improving the carry distance of a ball.

Solutions to the Problems

The inventors of the present invention have conducted intensive studies and found the aforementioned problems are solved by applying the present invention described below. Accordingly, the present invention has been completed.

The embodiments of the present invention are structured as follows.

[1] A golf club shaft structured to have multiple fiber-reinforced plastic layers made of resin and a fiber material, including a straight layer containing the fiber material disposed at an orientation angle of −5 to +5 degrees relative to the longitudinal direction of the shaft; a bias layer formed with an angle layer containing the fiber material disposed at an orientation angle of −20 to −75 degrees relative to the longitudinal direction of the shaft and another angle layer containing the fiber material disposed at an orientation angle of +20 to +75 degrees relative to the longitudinal direction of the shaft; a smaller-diameter tip end on one end; and a larger-diameter butt end on the other end. Such a golf club shaft satisfies formula (1) below when the length of the golf club shaft is set as "L" (mm), the weight as "W" (g), and the displacement as "D" (mm) that is observed when a cantilever bending test is conducted by exerting a predetermined load in the vicinity of the tip end while supporting the butt end to measure the displacement at the tip end.

$$455 \leq D + 7.5 \times W \times (1168/L) \leq 515 \tag{1}$$

[2] The golf club shaft according to [1], which satisfies formula (2) below when the length of the golf club shaft is set as "L" (mm) and the weight as "W" (g).

$$25 \leq W \times (1168/L) \leq 57 \tag{2}$$

[3] The golf club shaft according to [1] or [2], which satisfies formulas (3) and (4) below when the bending stiffness at a portion 525 mm from the tip end of the shaft is set as "EIb" (N·m²) and the bending stiffness at a portion 175 mm from the butt end of the shaft is set as "EIc" (N·m²).

$$21 \leq EIb \leq 50 \tag{3}$$

$$31 \leq EIc \leq 70 \tag{4}$$

[4] The golf club shaft according to any of [1]~[3], which includes at least one fiber-reinforced plastic layer containing the fiber material with an elastic modulus of 280 to 500 GPa and a tensile strength of 5500 to 8500 MPa.

[5] The golf club shaft according to any of [1]~[4], which includes at least one fiber-reinforced plastic layer containing the fiber material with an elastic modulus of 280 to 500 GPa and a tensile strength of 5500 to 8500 MPa among the fiber-reinforced plastic layers arranged in a region located at 30% of the entire shaft length from the tip end in the longitudinal direction of the shaft.

[6] The golf club shaft according to any of [1]~[5], which includes at least one fiber-reinforced plastic layer containing the fiber material with an elastic modulus of 280 to 500 GPa and a tensile strength of 5500 to 8500 MPa among the fiber-reinforced plastic layers containing the fiber material disposed at an orientation angle of −5 to +5 degrees relative to the longitudinal direction of the shaft.

[7] The golf club shaft according to any of [1]~[6], which satisfies formula (5) below when the distance from the tip end to the gravity center of the shaft is set as "Lg" (mm) and the entire length of the shaft is set as "Ls" (mm).

$$54 \leq (Lg/Ls) \times 100 \leq 62 \quad (5)$$

[8] The golf club shaft according to any of [1]~[7], in which a weight-adjustment layer "Wp" is located on the butt-end side from the center of the shaft, and the weight-adjustment layer "Wp" is set to be 5 to 30% of the entire weight of the shaft.

[9] The golf club shaft according to any of [1]~[8], which satisfies formula (6) below when the kickpoint of the shaft is set as "Kp" (%).

$$40 \leq Kp \leq 48 \quad (6)$$

[10] The golf club shaft according to any of [1]~[9], which satisfies formula (7) below when the torque of the shaft is set as "Tq" (degrees).

$$4 \leq Tq \leq 12 \quad (7)$$

[11] A golf club structured to have the golf club shaft according to any of [1]~[10], which satisfies formulas (8) and (9) below when the club head weight is set as "Mh" (g) and the entire weight of the golf club is set as "Mc" (g).

$$170 \leq Mh \leq 220 \quad (8)$$

$$215 \leq Mc \leq 315 \quad (9)$$

Effects of the Invention

According to the embodiments of the present invention, a fiber-reinforced plastic golf club shaft has high bending stiffness despite its light weight. As a result, a golf club shaft made of a fiber-reinforced plastic is provided to exhibit a longer carry distance while showing excellent ball flight patterns regardless of the skills of a golfer.

BRIEF DESCRIPTION OF THE DRAWINGS

FIG. 7A is a diagram showing final landing positions of balls hit by a first tester in a ball striking evaluation conducted by three testers (Example 1, Comparative Example 1);

FIG. 7B is a diagram showing final landing positions of balls hit by a second tester in the ball striking evaluation conducted by three testers (Example 1, Comparative Example 1);

FIG. 7C is a diagram showing final landing positions of balls hit by a third tester in the ball striking evaluation conducted by three testers (Example 1, Comparative Example 1);

FIG. 10 is a view schematically showing patterns of prepreg sheets used in Example 3 and Comparative Example 3;

FIG. 12 is a view schematically showing patterns of prepreg sheets used in Examples 4 and 5;

DETAILED DESCRIPTION OF THE EMBODIMENTS

Figure 1:
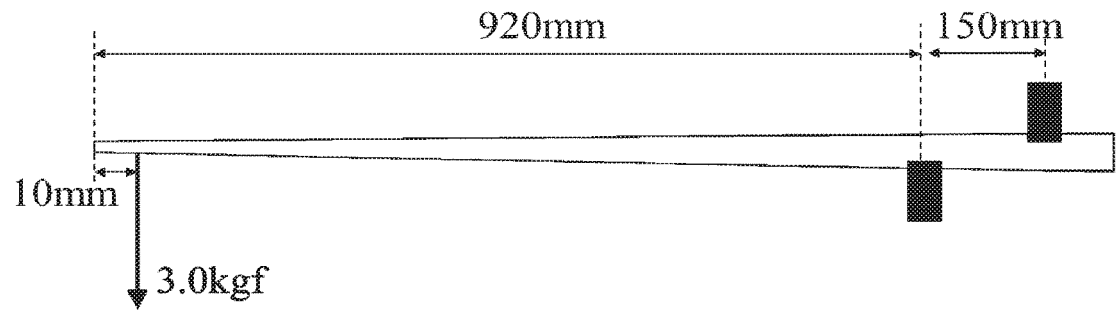
FIG. 1 is a view schematically showing a method for conducting a cantilever bending test.

In the following, embodiments of the present invention are described in detail.

(Golf Club Shaft)

In a fiber-reinforced plastic golf club shaft according to an embodiment of the present invention, the outer diameter of a plane that is cut perpendicular to the axial direction is set to increase from one end toward the other in a longitudinal direction, but the outer diameter is set to be constant from a diameter-switching point to the other end. In the following, the end where the outer diameter is smaller is referred to as a tip end, and the end where the outer diameter is larger is referred to as a butt end. Moreover, when measured from the diameter-switching point in the longitudinal direction of a shaft, the portion toward the tip end is referred to as the smaller-diameter portion and the portion toward the butt end as the larger-diameter portion.

In an embodiment of the present invention, a golf club shaft made of a fiber-reinforced plastic is structured to have a bias layer, which includes an angle layer containing a fiber material disposed at an orientation angle of −20 to −75 degrees relative to the longitudinal direction of the shaft and another angle layer containing a fiber material disposed at an orientation angle of +20 to +75 degrees relative to the longitudinal direction of the shaft; namely, reinforcing fibers are wound at an angle of 20 to 75 degrees in either a positive or negative direction. The shaft is also structured to have a straight layer where a reinforcing fiber material is wound at an angle of −5 to +5 degrees relative to the longitudinal direction of the shaft. The golf club shaft of the present embodiment is structured to have multiple fiber-reinforced plastic layers made of resin and fiber materials. Such fiber-reinforced plastic layers are formed by a sheet-wrapping method; that is, multiple fiber-reinforced plastic sheets (prepreg), made of fiber materials unidirectionally aligned relative to the fiber longitudinal direction and impregnated with resin, are wrapped multiple times around a mandrel (a core), and are then heated and molded.

In the present embodiment, fiber materials used in fiber-reinforced plastic layers are glass fibers, carbon fibers, aramid fibers, silicon-carbide fibers, alumina fibers, steel fibers or the like. Especially preferred are carbon fibers since they contribute to making fiber-reinforced plastic layers with excellent mechanical properties. Those fiber materials may be used alone or in combination thereof.

Matrix resins used in fiber-reinforced plastic layers are not limited to any specific type, but epoxy resins are usually used. Examples of epoxy resins are bisphenol-A, bisphenol-F and bisphenol-S epoxy resins, phenol novolac epoxy resins, cresol novolac epoxy resins, glycidylamine epoxy resins, isocyanate modified epoxy resins, alicyclic epoxy resins and the like. Liquid and solid types are available for those epoxy resins. Moreover, those epoxy resins may be used alone or in combination thereof.

For the golf club shaft of the present embodiment, it is important to satisfy formula (1) below when the shaft length is set as "L" (mm), its weight as "W" (g), and its displacement as "D" (mm) observed in a cantilever bending test.

$$455 \leq D + 7.5 \times W \times (1168/L) \leq 515 \quad (1)$$

When formula (1) is satisfied, it indicates the weight and flex are balanced, as required for a skilled golfer or a golfer with a high swing speed. Namely, a golf club shaft that does not satisfy formula (1) may be too heavy, or even if it is lightweight, it may be too soft for a skilled golfer or a golfer with a high swing speed, and thus may fail to provide stability.

A cantilever bending test is conducted by supporting one end of the shaft and by exerting a predetermined load in the vicinity of the other end to measure the displacement at the other end. More specifically, the butt end of the golf club shaft is supported and a predetermined load is exerted in the vicinity of the tip end to measure the displacement of the tip end. For example, as shown in FIG. 1, a point 920 mm from the tip end of the shaft is supported from beneath, a point 150 mm toward the butt end from that point (1070 mm from the tip end) is supported from above, and a load of 3.0 kgf is exerted on a point 10 mm from the tip end. The displacement of the tip end is the "displacement (D) in a cantilever bending test" in the present embodiment. The unit is set in millimeters.

When a load of 3.0 kgf causes an excessive amount of displacement and makes testing difficult, the load may be changed to one third (1.0 kgf) or one half (1.5 kgf). In such a case, when the actually measured displacement is set as $D_{1/3}$ or $D_{1/2}$, the displacement is calculated as $D=3 \times D_{1/3}$ or $D=2 \times D_{1/2}$.

Moreover, when the length of the golf club shaft is set as "L" (mm) and its weight as "W" (g), a preferred range is shown as follows.

$$25 \leq W \times (1168/L) \leq 57 \quad (2)$$

When set within the above range, swing speed is expected to improve. The range is more preferred to be $25 \leq W \times (1168/L) \leq 52$, even more preferably $25 \leq W \times (1168/L) \leq 48$, since further improvement in the carry distance is expected.

To set the bending stiffness of a shaft required for a skilled golfer or a golfer with a high swing speed, the golf club shaft of the present embodiment is preferred to satisfy formulas (3) and (4) below when the bending stiffness at a portion 525 mm from the tip end of the shaft is set as "EIb" (N·m²) and the bending stiffness at a portion 175 mm from the butt end of the shaft as "EIc" (N·m²).

$$21 \leq EIb \leq 50 \quad (3)$$

$$31 \leq EIc \leq 70 \quad (4)$$

In formula (3), an "EIb" of lower than 21 makes the swing unstable because the shaft bends too much. On the other hand, an "EIb" exceeding 50 results in a significantly small bend of the shaft, thus suppressing an increase in the head speed or making the ball flight too low. An "EIc" of lower than 31 causes unstable ball flight patterns, and an "EIc" exceeding 70 reduces head speed. Namely, when formulas (3) and (4) are both satisfied, a golf club shaft is provided to exhibit excellent ball flight patterns without reducing the carry distance.

Furthermore, the golf club shaft of the present embodiment is formed with multiple fiber-reinforced plastic layers. Especially, the fiber-reinforced plastic layers are preferred to be made of carbon fibers. Namely, the present embodiment is preferred to contain at least one fiber-reinforced plastic layer made of a fiber material with an elastic modulus of 280 to 500 GPa, especially preferably made of a carbon fiber material. A golf club shaft containing a fiber-reinforced plastic layer made of such a fiber material is lightweight and shows excellent ball flight patterns. A fiber material having an elastic modulus of 300 to 460 GPa is more preferable since ball flight patterns are further improved, and a fiber material with an elastic modulus of 320 to 400 GPa is even more preferable since ease of handling is achieved during the molding process of a shaft. Such a fiber-reinforced plastic layer may be single, but multiple layers are preferable. It is especially preferable if such a resin layer is arranged in a region located at 30% of the entire shaft length from the tip end in the shaft longitudinal direction. By so setting, ball flight patterns are further improved. In addition, if such a fiber-reinforced plastic layer is used for at least one of the fiber-reinforced plastic layers containing fiber materials disposed at an orientation angle of −5 to +5 degrees, ball flight patterns with even greater stability are achieved. It is most preferable if such a fiber-reinforced plastic layer is employed in all the fiber-reinforced plastic layers with an orientation angle of −5 to +5 degrees.

In addition, the above fiber-reinforced plastic layer is preferred to contain a fiber material with a tensile strength of 5500 to 8500 MPa, since the strength of a shaft is sufficiently maintained. Moreover, a fiber material with a tensile strength of 6500 to 8500 MPa is more preferred since an even further lightweight shaft is obtained, and a fiber material with a tensile strength of 6700 to 8500 MPa is even more preferred because a lightweight shaft with high strength is obtained. Here, it is further preferable if a shaft contains multiple such fiber-reinforced plastic layers, and it is most preferable if such fiber-reinforced plastic layer is used in all the fiber-reinforced plastic layers containing fiber materials disposed at an orientation angle of −5 to +5 degrees.

The golf club shaft of the present embodiment is preferred to have a balance point of at least 54%, since a heavier head weight is expected to improve the carry distance. If the balance point is no higher than 54%, even if the head weight is made heavier in an attempt to extend the carry distance, a longer carry distance is unlikely to be achieved because the shaft feels heavy during the swing, thus lowering the ease of swinging the club, and it is therefore difficult to increase the ball speed.

The balance point is more preferably 55% or higher, even more preferably 56% or higher, most preferably 57% or higher. The higher the balance point, the easier it is to make a heavier head weight, and a longer carry distance is expected.

To get a higher balance point, the number of fiber-reinforced plastic layers on the tip-end side needs to be reduced so as to mold a lightweight shaft. Accordingly, a balance point, when set too high, may result in breakage caused by insufficient strength at the tip end. Therefore, the balance point is preferred to be 62% or lower, more preferably 61% or lower, most preferably 60% or lower.

(Balance Point)

Figure 2:
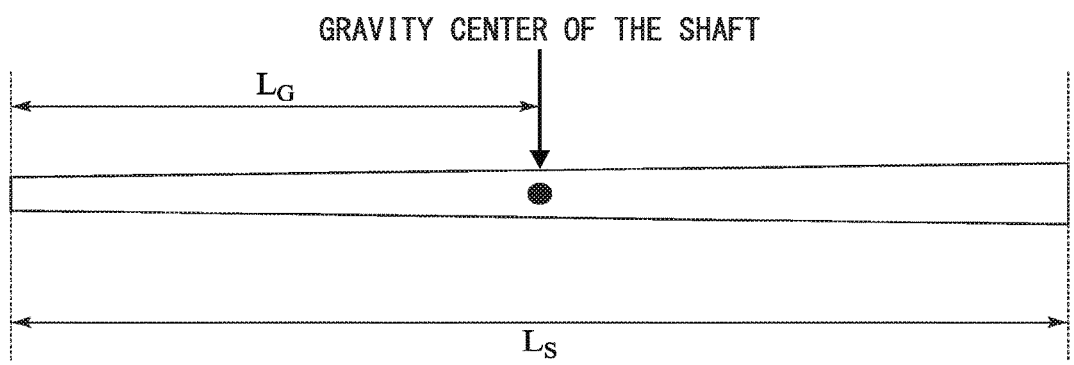
FIG. 2 is a view schematically showing the gravity center of a golf club and its position measured from the tip end.

Here, as shown in FIG. 2, a balance point is indicated by a ratio of distance (Lg), measured from the tip end 61 to the gravity center 70 of a shaft 60, relative to the entire length ($L_S$) of the shaft. Namely, the balance point is obtained by the following formula.

balance point (%)=($Lg/L_S$)×100

Using the balance point, a quantitative value of the gravity center of a shaft is determined. That is, the golf club shaft of the present embodiment is preferred to satisfy formula (5) below.

$54 \leq (Lg/L_S) \times 100 \leq 62$ (5)

In the golf club shaft of the present embodiment, a weight-adjustment layer "Wp" is preferred to be positioned on the butt-end side from the center of the shaft (50% of the entire length), and the weight-adjustment layer "Wp" is preferred to be at least 5% but no greater than 30% of the entire weight.

By setting the weight-adjustment layer "Wp," it is easier to achieve a high balance point. Here, a "high balance point" means that the value of the balance point calculated by the formula above is at least 54%.

In the present embodiment, the material of a weight-adjustment layer "Wp" is not limited specifically.

When set to be too lightweight, a "Wp" fails to achieve the balance point, and when set to be too heavy, the "Wp" causes an excessive weight increase in the golf shaft. The weight of "Wp" is preferred to be 10 to 25%, more preferably 15 to 20%, of the entire shaft weight.

When a "Wp" is positioned on the tip-end side from the center of the shaft (50% of the entire length), a high balance point is not achieved. A "Wp" is preferred to be positioned more than 60%, more preferably more than 70%, of the entire length toward the butt end.

The golf club shaft of the present embodiment is preferred to have a smaller torque (Tq) to achieve stable ball flight patterns. A "Tq" of smaller than 4 degrees is not preferable, because the number of laminated bias layers increases, thus causing a heavier shaft. Accordingly, such a "Tq" may result in a slower head speed during the swing, and the carry distance is thereby reduced. On the other hand, even though a "Tq" of greater than 12 degrees contributes to a lightweight shaft, it is not preferable, since the shaft strength tends to be insufficient, while the ball flight patterns become unstable. To achieve both a longer carry distance and stable ball flight patterns, a torque is more preferred to be in a range specified by the formula (7) below.

$4 \leq Tq \leq 10$ (7)

(Torque)

Here, a torque is defined as a twist angle obtained by clamping the tip and butt ends of a shaft by using chucks and by exerting a twist torque (1.36 N·m) on the shaft through the chucks.

For the golf club shaft of the present embodiment, a kickpoint (Kp) of lower than 40% is not preferred, since ball flight patterns become unstable. A kickpoint of higher than 48% is not preferred, either, since the shaft is likely to be difficult to use and a higher trajectory shot is hard to achieve. A preferable range of a kickpoint is $41 \leq Kp \leq 47$, more preferably $42 \leq Kp \leq 46$.

(Kickpoint)

Here, when both the tip and butt ends of a shaft are compressed to make a bending deformation in the longitudinal direction, a kickpoint is expressed as the ratio of the distance from the tip end to the bending peak point relative to the entire length of the shaft.

The golf club shaft of the present embodiment is preferred to satisfy the following conditions in three-point bending tests conducted on type C shafts (products made of nonmetallic materials such as fiber-reinforced plastics) in accordance with "Approval Certification Standards for Golf Club Shafts and Approval Confirmation Method" regulated by the Consumer Product Safety Association (CPSA standard No. 0098, approved by the Japanese Minister of International Trade and Industry, Industry 5, No. 2087, Oct. 4, 1993).

point $T \geq 700$ N point $A \geq 300$ N point $B \geq 300$ N point $C \geq 300$ N When the above strength is satisfied, breakage of the shaft used as a golf club is expected to be lowered. It is more preferable when the following ranges are satisfied.

point $T \geq 800$ N point $A \geq 400$ N point $B \geq 400$ N point $C \geq 400$ N The following ranges are even more preferable.

point $T \geq 900$ N point $A \geq 500$ N point $B \geq 500$ N point $C \geq 500$ N The following ranges are especially preferable.

point $T \geq 1000$ N point $A \geq 600$ N point $B \geq 600$ N point $C \geq 600$ N Furthermore, the golf club shaft of the present embodiment is preferred to satisfy the following conditions when the total thickness of the laminated hoop layers is set as "Th," the total thickness of the laminated bias layers as "Tb" and the total thickness of the laminated straight layers as "Ts" in the region 400 mm from the tip end to the butt end.

0.03 mm $\leq Th \leq$ 0.18 mm 0.08 mm $\leq Tb \leq$ 0.30 mm 0.05 mm $\leq Ts \leq$ 0.50 mm If a "Th" is too small, sufficient strength is not achieved. On the other hand, if a "Th" is too great, a sufficiently lightweight shaft is not obtained.

If a "Tb" is too small, it results in loose torque, and thus the shaft fails to function. On the other hand, if a "Tb" is too great, a sufficiently lightweight shaft is not obtained.

If a "Ts" is too small, it results in an excessively soft shaft, which fails to function. On the other hand, if a "Ts" is too great, a sufficiently lightweight shaft is not obtained.

It is more preferable when the following ranges are satisfied.

0.07 mm $\leq Th \leq$ 0.15 mm 0.10 mm $\leq Tb \leq$ 0.25 mm 0.08 mm $\leq Ts \leq$ 0.45 mm To achieve both strength and light weight, the following ranges are even more preferable.

0.08 mm $\leq Th \leq$ 0.14 mm 0.12 mm $\leq Tb \leq$ 0.23 mm 0.10 mm $\leq Ts \leq$ 0.25 mm From the same viewpoints as above, the following ranges are especially preferable.

0.09 mm $\leq Th \leq$ 0.13 mm 0.14 mm $\leq Tb \leq$ 0.21 mm 0.12 mm $\leq Ts \leq$ 0.21 mm The region for which to set the conditions as above may be the entire shaft length, but, from the viewpoints of making a lightweight shaft, it is preferred to be the region 400 mm from the tip end to the butt end.

Types of golf clubs equipped with the golf club shaft of the present embodiment are not limited specifically, but woods are preferred for achieving excellent carry distance and ball flight patterns. The shaft is especially preferred to be used on a 1 wood, also called a driver. When the head weight of a golf club is set as "Mh" (g) and the entire weight of the golf club as "Mc" (g), the shaft is most effective if formulas (8) and (9) below are satisfied.

$170 \leq Mh \leq 220$  (8)

$215 \leq Mc \leq 315$  (9)

If an "Mh" is too small, energy is not conveyed sufficiently from the head to the ball, and thus fails to extend the carry distance. If an "Mh" is too great, energy is sufficiently conveyed, but the head speed is not fast enough, and thus fails to extend the carry distance as well. Moreover, an excessively small "Mc" causes unstable swing, and breakage rates may increase when golf clubs are being used. An "Mc" that is too large fails to extend the carry distance because a faster head speed is not obtained.

To further extend the carry distance using a 1 wood outfitted with such a shaft, the following ranges are more preferable.

$180 \leq Mh \leq 210$ $225 \leq Mc \leq 295$

The following ranges are even more preferable.

$185 \leq Mh \leq 205$ $230 \leq Mc \leq 290$

EXAMPLES

Example 1

Figure 3:
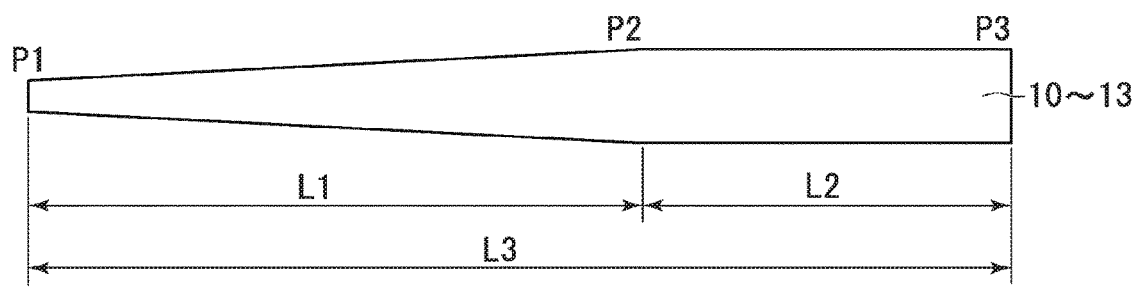
FIG. 3 is a view schematically showing the shape of a mandrel used in examples and comparative examples.

A mandrel 10 (made of iron) shaped as shown in FIG. 3 was prepared. Mandrel 10 has an entire length of L3, and its outer diameter gradually increases linearly from tip end P1 to P2, which is the point (switching point) at length L1 measured from P1, but stays the same from switching point P2 to butt end P3, which is length L2 distant from P2. The outer diameters, lengths and tapering degrees of mandrel 10 in Example 1 are specified below and are shown in Table 1.

The outer diameter of tip end P1 is 4.85 mm, the outer diameter of switching point P2 is 14.30 mm, and the outer diameter from switching point P2 to butt end P3 stays the same at 14.30 mm. Length L1 from tip end P1 to switching point P2 is 850 mm and length L2 from switching point P2 to butt end P3 is 650 mm. The entire length L3 of mandrel 10 is 1500 mm, and the tapering degree from tip end P1 to switching point P2 is 11.12/1000.

Figure 4:
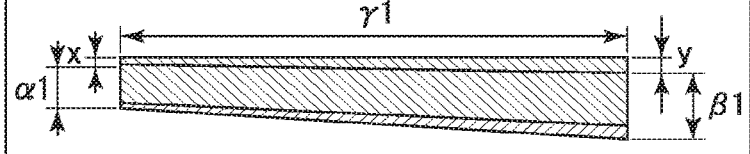
FIG. 4 is a view schematically showing patterns of prepreg sheets used in Example 1 and Comparative Example 1.

Prepreg sheets (patterns 1~7) cut into the shapes shown in FIG. 4 are consecutively wrapped around mandrel 10, and a 20 mm-wide polypropylene shrink tape was further wound thereon at a pitch of 2 mm. Pattern 1 is formed by laminating two prepreg sheets of carbon fibers (CF); namely, an angle layer set to have an orientation angle of +45 degrees relative to the mandrel axis direction and another angle layer set to have an orientation angle of −45 degrees are laminated to be shifted from each other by substantially half the circumference of mandrel 10. Pattern 2 is a prepreg for forming a hoop layer, where carbon fibers (CF) are disposed at an orientation angle of 90 degrees relative to the mandrel axis direction. Pattern 2 is laminated in advance with pattern 3 and is wrapped on the mandrel.

In Example 1, two prepreg sheets of pattern 1 are wrapped to form a bias layer, each containing fiber materials disposed at 45 degrees in either a positive or negative direction relative to the main axis of mandrel 10. Pattern 2 is wrapped to form a hoop layer containing fiber materials disposed at 90 degrees relative to the main axis of mandrel 10. Patterns 3~7 are wrapped to form straight layers that contain fiber materials disposed at 0 degrees relative to the main axis of mandrel 10.

The materials of prepreg sheets in FIG. 4 are shown in Tables 2 and 3-1, and the sizes of prepreg patterns 1~7 are shown in Table 4-1. The numbers in Tables 3-1 and 3-2 correspond to the prepreg numbers in Table 2 (in other words, the numbers in Tables 3-1 and 3-2 each correspond to the number assigned to a prepreg "X" in Table 2).

On mandrel 10, the region on which to wrap prepreg sheets was set to be located from 70 mm to 1260 mm measured from the tip end toward the butt end of the mandrel. Patterns 1~7 formed using prepreg item numbers 1, 2 and 3 were wrapped consecutively on mandrel 10, which was then put in a heating furnace to be kept there at 135° C. for 2 hours, and naturally cooled to normal temperature. Then, the cured shaft was removed from mandrel 10 and the shrink tape was peeled off. The surface was polished so that the natural frequency of the shaft was set at 260 cpm.

In Example 1, as shown in FIG. 4 and Table 4-1, a bias layer is formed by laminating two sheets of prepreg, one for an angle layer containing carbon fibers (CF) having an orientation angle of +45 degrees relative to the axis of the mandrel and one for another angle layer having an orientation angle of −45 degrees. Those two prepreg sheets are shifted from each other by 22 mm (y) at the butt end and 9 mm (x) at the tip end.

Regarding the obtained shaft, its length, weight, outer diameters at a point 10 mm from the tip end and a point 25 mm from the butt end, frequency, torque, and cantilever bending displacement are shown in Table 5-1. Those values are obtained as the average values of four shafts.

Moreover, the values calculated below are shown in Table 5-1.

$$D + 7.5 \times W \times (1168/L) \quad (1)'$$

$$W \times (1168/L) \quad (2)'$$

In addition, the bending strengths of the shaft determined by three-point bending tests are shown in Table 6-1. Each value is the average value obtained by testing four shafts.

(1) Frequency

The frequency was measured by the method described in JP H10-225541A.

Using a Golf Club Timing Harmonizer made by Fujikura Composite Co., Ltd., a 196 gram weight simulating a club head was mounted on the tip end of a shaft, and a point 180 mm from the butt end of the shaft was fixed to the device so as to measure the natural frequency of the shaft.

(2) Torque: Twist Angle of Entire Shaft

The torque (twist angle of the entire shaft) was measured by the method described in JP H5-337223A.

Namely, the twist angle was measured by clamping the tip and butt ends with chucks, and by exerting a twist torque (1.36 N·m) on the shaft through the chucks.

(3) Three-Point Bending Test

Figure 5:
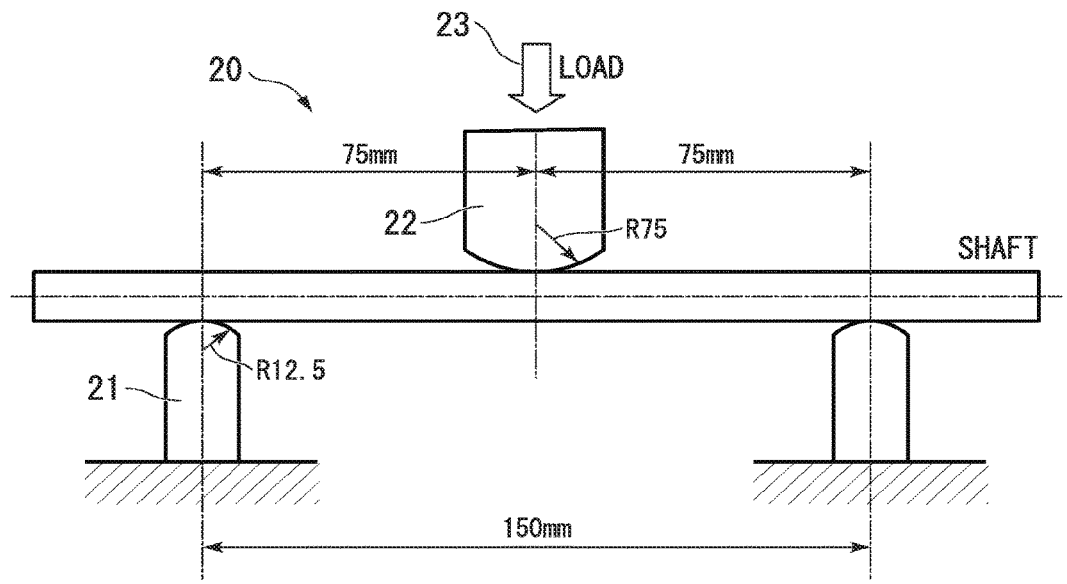
FIG. 5 is a view schematically showing an apparatus for a three-point bending test of a golf shaft (load point T)

Three-point bending tests were conducted in accordance with the method specified for a type C shaft in "Approval Certification Standards for Golf Club Shafts and Approval Confirmation Method" regulated by the Consumer Product Safety Association. Tests were conducted at load point T (90 mm from the tip end of a shaft), load point A (175 mm from the tip end), load point B (525 mm from the tip end) and load point C (175 mm from the butt end) as specified in "Approval Certification Standards for Golf Club Shafts and Approval Confirmation Method." FIG. 5 is a view schematically showing an apparatus 20 for testing three-point bending strength. Apparatus 20 is structured to have a pair of supporting members 21 set apart horizontally at a distance of 150 mm, load member 22 and load measuring member 23. The three-point bending test was conducted by setting a point 90 mm from the tip end of a shaft (load point T) to be directly beneath load member 22. The load exertion rate was set at 20 mm/min, and to prevent damage from compression at the load point, a 2 mm-thick HSD 70 silicone rubber piece was used for the test.

Figure 6:
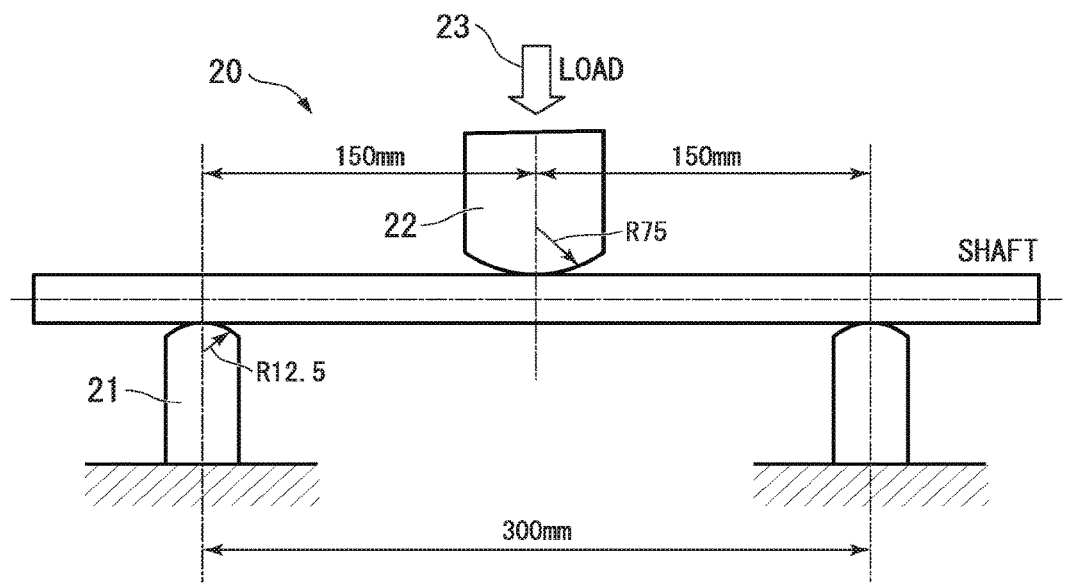
FIG. 6 is a view schematically showing an apparatus for a three-point bending test of a golf shaft (load points A, B and C)

Three-point bending tests were also conducted at load point A (175 mm from the tip end), load point B (525 mm from the tip end) and load point C (175 mm from the butt end) the same as above except for arranging a pair of supporting members 21 horizontally at a distance of 300 mm from each other as shown in FIG. 6.

(4) Method for Cantilever Bending Test

As shown in FIG. 1, a point 920 mm from the tip end of a shaft was supported from below, while a point 150 mm toward the butt end from that point (1070 mm from the tip end) was supported from above, and a load of 3.0 kgf was exerted on a point 10 mm from the tip end. The displacement observed at the tip end is the "displacement (D) in a cantilever bending test" in the present embodiment. The unit is set in millimeters. If testing is found difficult since a load of 3.0 kgf causes an excessive amount of displacement, the load may be changed to one third (1.0 kgf) or one half (1.5 kgf). In such a case, when the actually measured displacement is set as $D_{1/3}$ or $D_{1/2}$, the "displacement (D) in a cantilever bending test" was calculated as $D=3 \times D_{1/3}$ or $D=2 \times D_{1/2}$.

(5) Kickpoint

The kickpoint was determined by the method described in JPH10-225541A.

The kickpoint was expressed by the ratio of the kickpoint position (length from the tip end) determined by using a kickpoint gauge FG-105RM made by Fourteen Co., Ltd. relative to the entire length of the shaft.

[Mounting Club Head and Grip]

On the golf club shaft of Example 1, a commercially available titanium club head for drivers (volume: 440 cm³, weight: 204 grams, loft angle: 9.5°) was mounted on the tip end using an acrylic resin adhesive. Then, the shaft was cut off at 75 mm from the butt end, and a commercially available rubber grip was mounted thereon using a double-sided tape. Accordingly, the golf club of Example 1 was obtained.

[Evaluation of Ball Striking]

Actual ball striking testing was conducted on the golf club by three testers, "Tester A," "Tester B" and "Tester C," whose head speeds are 39 m/s, 42 m/s and 47 m/s respectively, and carry distances were measured five times using a "TrackMan" made by Interactive Sports Games A/S. The results are shown in FIGS. 7A, 7B and 7C. The average carry distance and average horizontal shift off the target obtained from the results of the three testers are shown in Table 5-1.

Comparative Example 1

A shaft was prepared and evaluated the same as in Example 1 except that after the prepreg sheets cut into shapes shown in FIG. 4 to have sizes shown in Table 4-1 were wrapped and cured by employing the same process as in Example 1, the shaft surface was polished to have a natural frequency of 252 cpm.

Regarding the obtained shaft, its length, weight, outer diameters at a point 10 mm from the tip end and a point 25 mm from the butt end, frequency and torque are shown in Table 5-1. Those values are obtained as the average values of six shafts. Also, the bending strengths of the present shaft determined by three-point bending tests are shown in Table 6-1. Each value is the average obtained by testing four shafts.

[Mounting Golf Club Head and Grip]

A golf club was prepared the same as in Example 1.

[Evaluation of Ball Striking]

The same as in Example 1, actual ball striking testing was conducted on the golf club by three testers, "Tester A," "Tester B" and "Tester C," whose head speeds are 38 m/s, 42 m/s and 47 m/s respectively, and carry distances were measured five times using a "TrackMan" made by Interactive Sports Games A/S. The results are shown in FIGS. 7A, 7B and 7C. The average carry distance and average horizontal shift off the target obtained from the results of the three testers are shown in Table 5-1.

Example 2

In Example 2, mandrel 11 (made of iron) was prepared to have sizes as specified in Table 1. On mandrel 11, prepreg sheets cut into shapes shown in FIG. 8 were consecutively wrapped by employing the same procedures as in Example 1. On mandrel 11, the region to wrap prepreg sheets was set to be located from 130 mm to 1320 mm measured from the tip end toward the butt end of the mandrel. The prepreg sheets used in the present embodiment are shown in Tables 2 and 3-1. After the shaft was cured the same as in Example 1, the shaft was processed and evaluated the same as in Example 1 except that the shaft was polished to have a natural frequency of 292 cpm.

[Mounting Golf Club Head and Grip]

A golf club was obtained the same as in Example 1.

[Evaluation of Ball Striking]

Figure 9A:
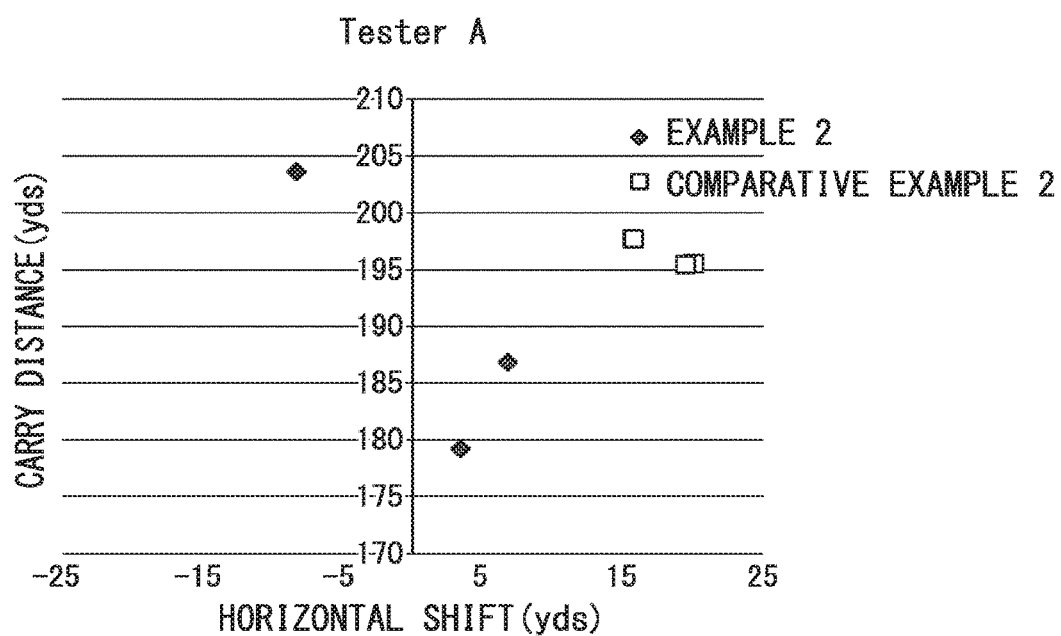
FIG. 9A is a diagram showing final landing positions of balls hit by a first tester in the ball striking valuation conducted by three testers (Example 2, Comparative Example 2)
Figure 9B:
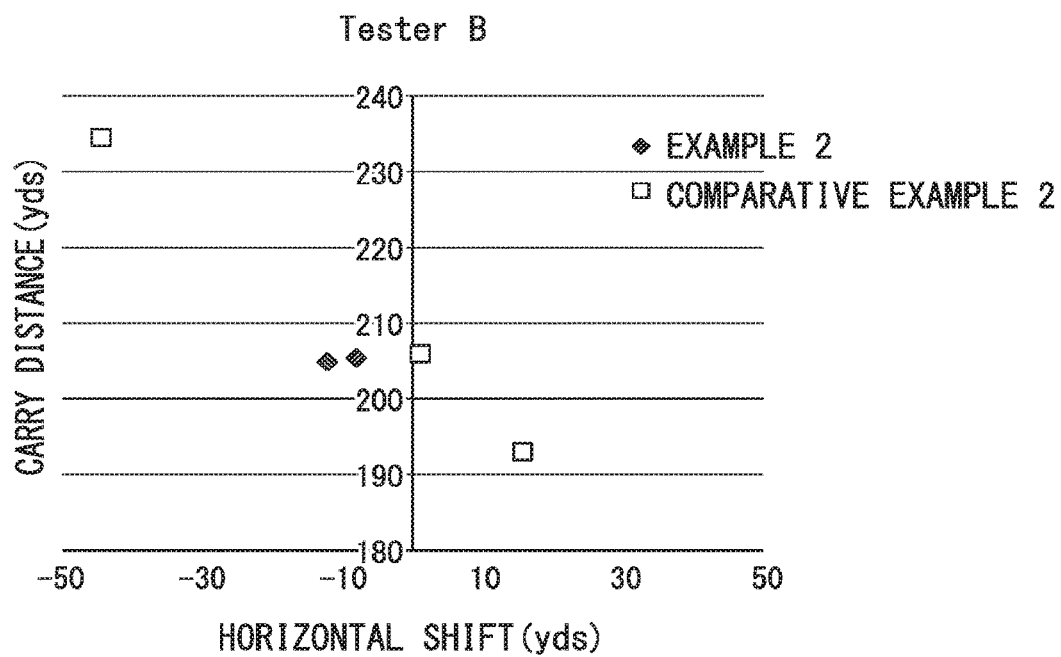
FIG. 9B is a diagram showing final landing positions of balls hit by a second tester in the ball striking evaluation conducted by three testers (Example 2, Comparative Example 2)
Figure 9C:
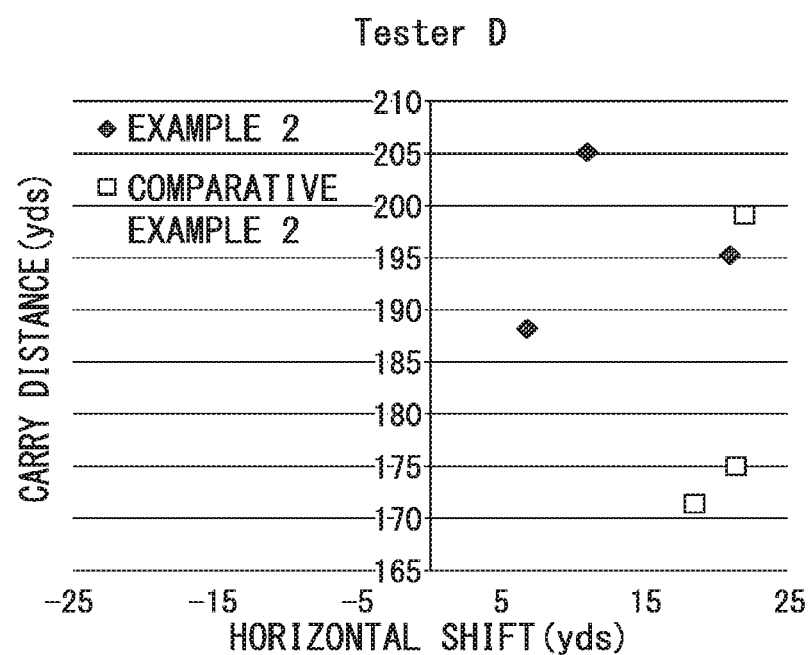
FIG. 9C is a diagram showing final landing positions of balls hit by a third tester in the ball striking evaluation conducted by three testers (Example 2, Comparative Example 2)

Actual ball striking testing was conducted on the golf club by three testers, "Tester A," "Tester B" and "Tester D" whose head speeds are 38 m/s, 42 m/s and 40 m/s respectively, and carry distances were measured three times using a "TrackMan" made by Interactive Sports Games A/S. The results are shown in FIGS. 9A, 9B and 9C. The average carry distance and average horizontal shift off the target obtained from the results of the three testers are shown in Table 5-1. In addition, the bending strengths of the present shaft determined by three-point bending testing are shown in Table 6-1.

Comparative Example 2

Figure 8:
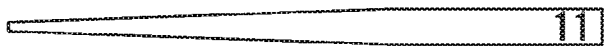
FIG. 8 is a view schematically showing patterns of prepreg sheets used in Example 2 and Comparative Example 2.

A shaft was prepared and evaluated the same as in Example 2 except that after prepreg sheets specified in Tables 2 and 3-1 and cut into shapes shown in FIG. 8 to have sizes shown in Table 4 were wrapped and cured by employing the same process as in Example 2, the shaft surface was polished to have a natural frequency of 282 cpm. Then, a club head and grip were mounted on the shaft, and ball striking testing was conducted. The results are shown in FIGS. 9A, 9B and 9C. The average carry distance and average horizontal shift off the target obtained from the results of the three testers are shown in Table 5-1. In addition, the bending strengths of the present shaft determined by three-point bending testing are shown in Table 6-1.

Example 3

Figure 11A:
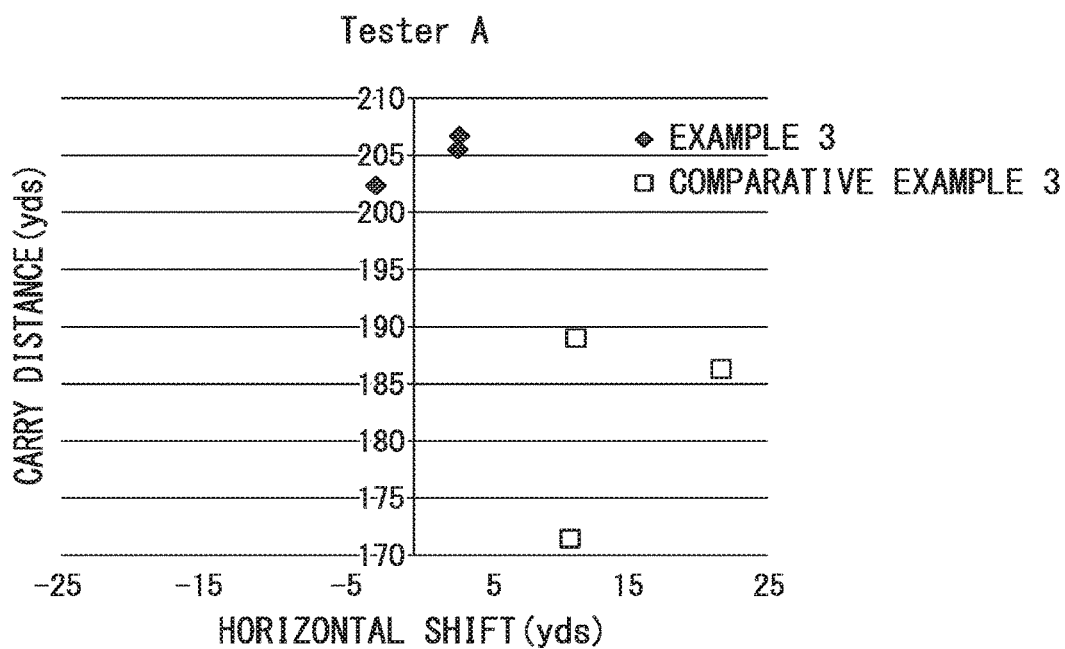
FIG. 11A is a diagram showing final landing positions of balls hit by a first tester in the ball striking valuation conducted by three testers (Example 3, Comparative Example 3)
Figure 11B:
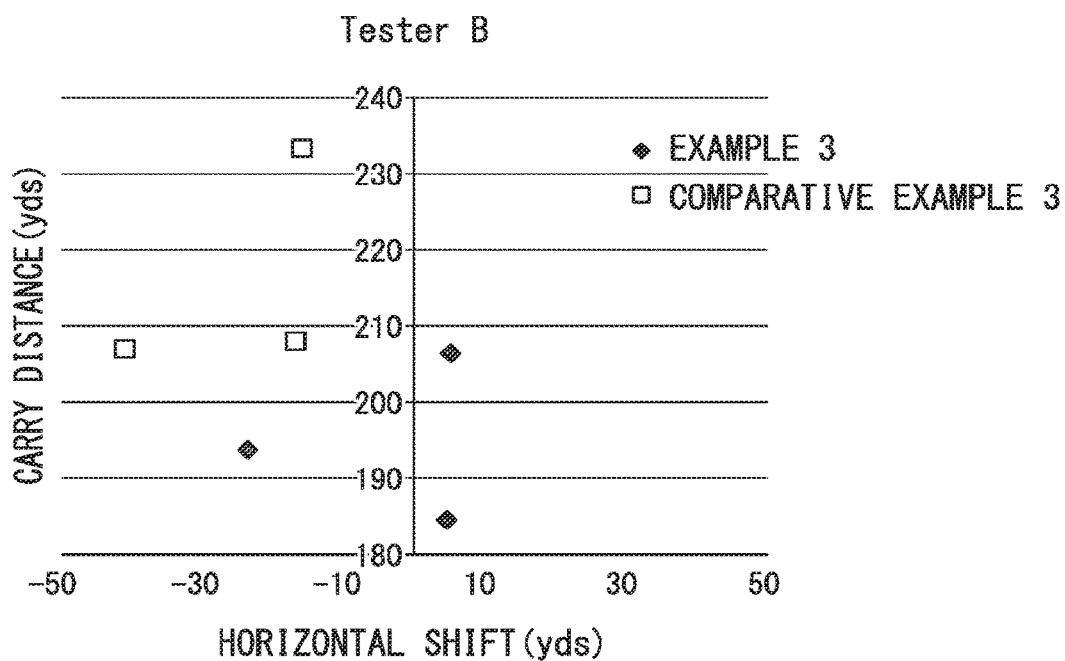
FIG. 11B is a diagram showing final landing positions of balls hit by a second tester in the ball striking evaluation conducted by three testers (Example 3, Comparative Example 3)
Figure 11C:
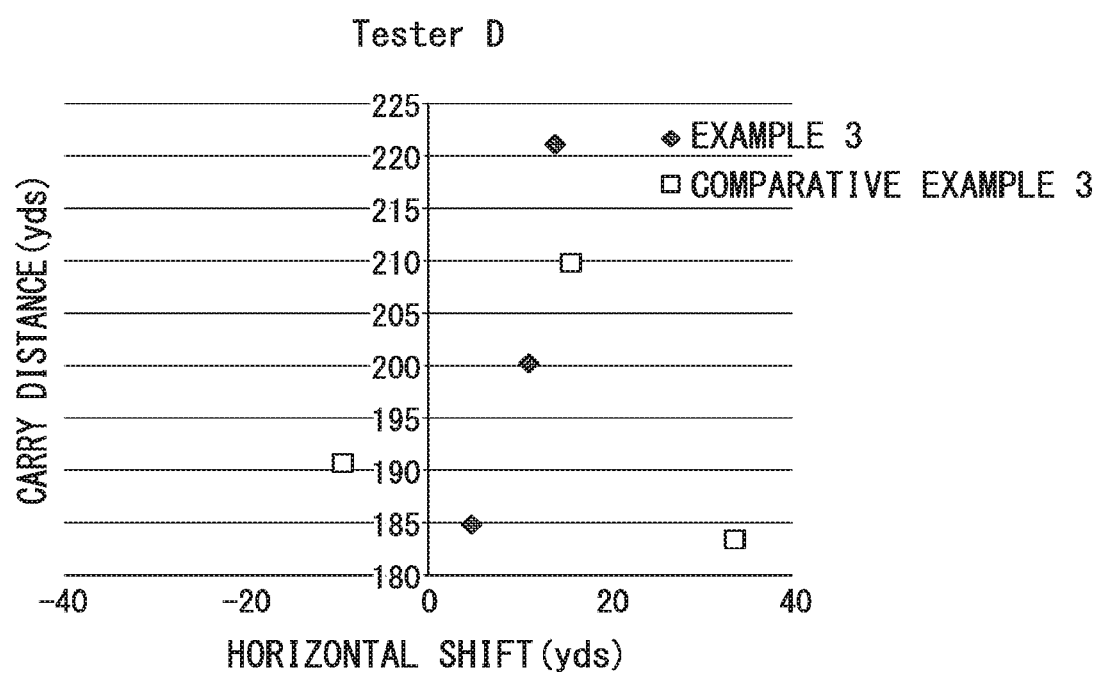
FIG. 11C is a diagram showing final landing positions of balls hit by a third tester in the ball striking evaluation conducted by three testers (Example 3, Comparative Example 3)

In Example 3, mandrel 12 (made of iron) with sizes specified in Table 1 was used. On mandrel 12, prepreg sheets cut into the shapes shown in FIG. 10 were consecutively wrapped by employing the same process as in Example 2. On mandrel 12, the region to wrap prepreg sheets was set to be located from 110 mm to 1300 mm measured from the tip end toward the butt end of the mandrel. The prepreg sheets used in the present example are shown in Tables 2 and 3-1. After the shaft was cured the same as in Example 1, the shaft was processed and evaluated the same as in Example 2 except that the shaft surface was polished to have a natural frequency of 215 cpm. Then, a golf club head and grip were mounted on the shaft, and ball striking testing was conducted. The results are shown in FIGS. 11A, 11B and 11C. The average carry distance and average horizontal shift off the target obtained from the results of the three testers are shown in Table 5-1. In addition, the bending strengths of the present shaft determined by three-point bending testing are shown in Table 6-1.

Comparative Example 3

A shaft was prepared and evaluated the same as in Example 2 except that after prepreg sheets specified in Tables 2 and 3-1 and cut into shapes shown in FIG. 10 to have sizes shown in Table 4 were wrapped and cured by employing the same process as in Example 2, the shaft surface was polished to have a natural frequency of 205 cpm. Then, a golf club head and grip were mounted on the shaft, and ball striking testing was conducted. The results are shown in FIGS. 11A, 11B and 11C. The average carry distance and average horizontal shift off the target obtained from the results of three testers are shown in Table 5-1. In addition, the bending strengths of the present shaft determined by three-point bending testing are shown in Table 6-1.

Example 4

Figure 13A:
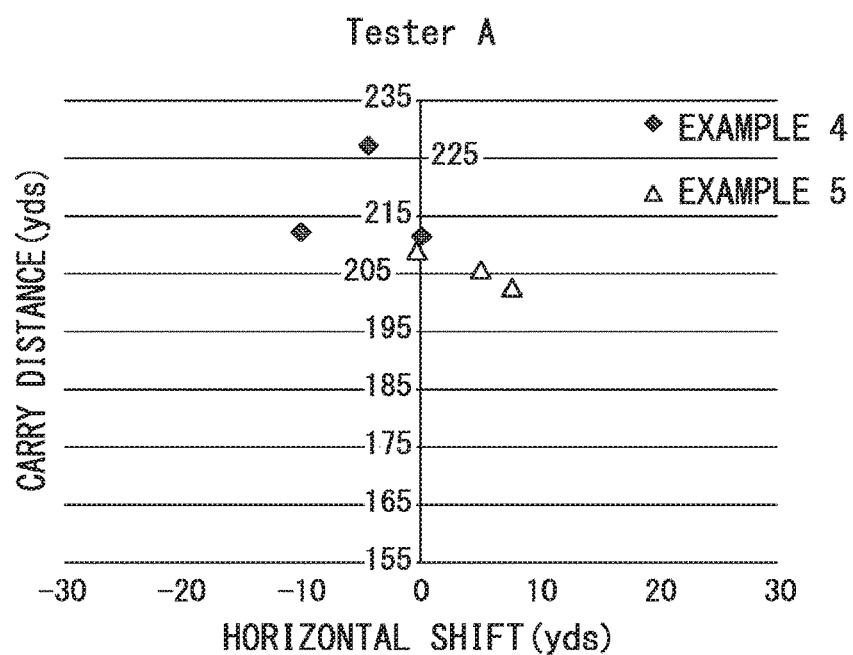
FIG. 13A is a diagram showing final landing positions of balls hit by a first tester in the ball striking valuation conducted by three testers (Examples 4, 5)
Figure 13B:
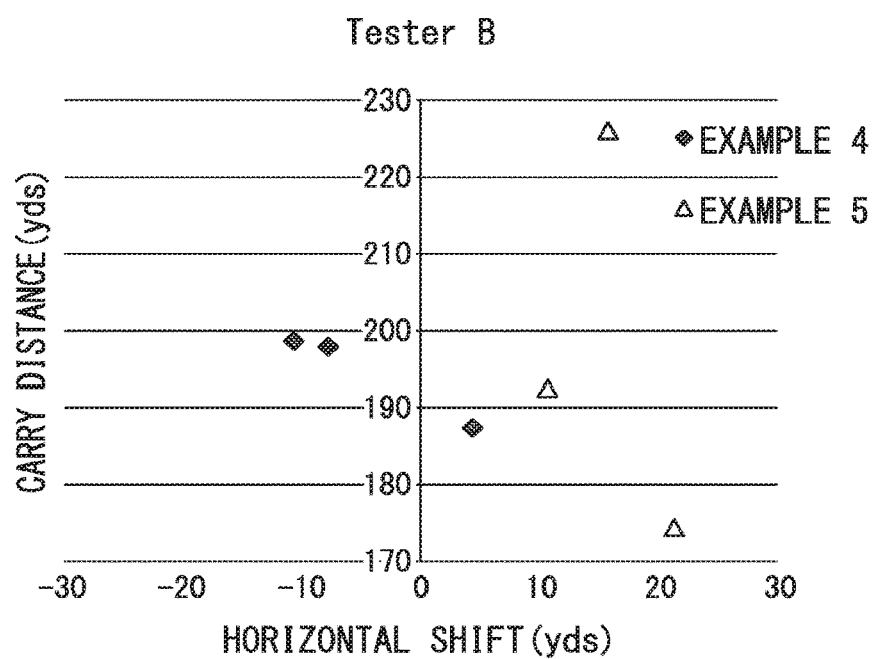
FIG. 13B is a diagram showing final landing positions of balls hit by a second tester in the ball striking evaluation conducted by three testers (Examples 4, 5)
Figure 13C:
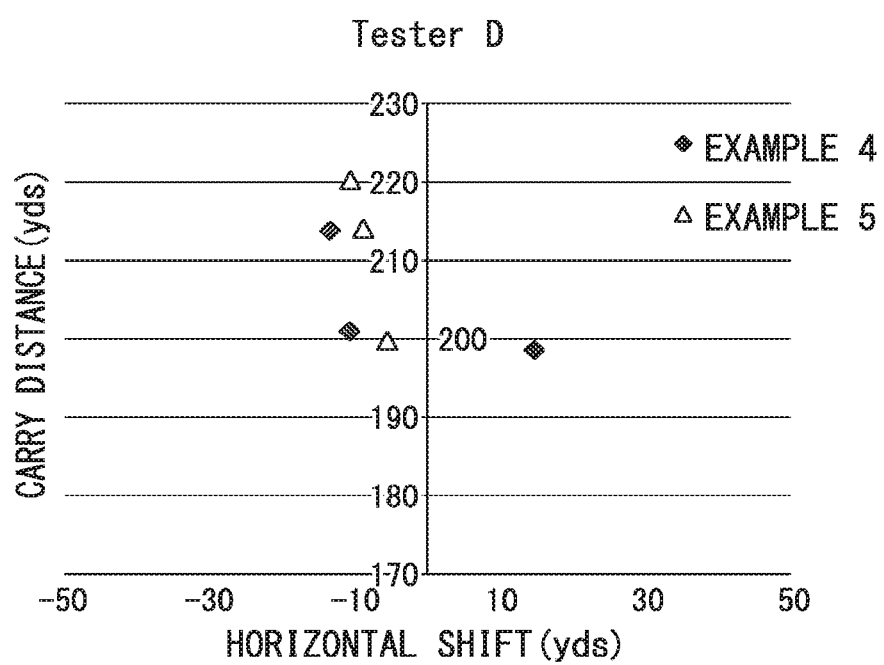
FIG. 13C is a diagram showing final landing positions of balls hit by a third tester in the ball striking evaluation conducted by three testers (Examples 4, 5).

In Example 4, mandrel 13 (made of iron) with sizes specified in Table 1 was used. On mandrel 13, prepreg sheets cut into the shapes shown in FIG. 12 were consecutively wrapped by employing the same process as in Example 3. On mandrel 13, the region to wrap prepreg sheets was set to be located from 60 mm to 1250 mm measured from the tip end toward the butt end of the mandrel. The prepreg sheets used in the present example are shown in Tables 2 and 3-1. After the shaft was cured the same as in Example 1, the shaft was processed and evaluated the same as in Example 3 except that the shaft surface was polished to have a natural frequency of 205 cpm. Then, a golf club head and grip were mounted on the shaft, and ball striking testing was conducted. The results are shown in FIGS. 13A, 13B and 13C. The average carry distance and average horizontal shift off the target obtained from the results of three testers are shown in Table 5-1. In addition, the bending strengths of the present shaft determined by three-point bending testing are shown in Table 6-1.

Example 5

A shaft was prepared and evaluated the same as in Example 4 except that after prepreg sheets specified in Tables 2 and 3-1 and cut into shapes shown in FIG. 12 to have sizes shown in Table 4 were wrapped and cured the same as in Example 4, the shaft surface was polished to have a natural frequency of 225 cpm. Then, a golf club head and grip were mounted on the shaft, and ball striking testing was conducted. The results are shown in FIGS. 13A, 13B and 13C. The average carry distance and average horizontal shift off the target obtained from the results of three testers are shown in Table 5-1. In addition, the bending strengths of the present shaft determined by three-point bending testing are shown in Table 6-1.

Examples 6~9

In Examples 6~9, prepreg sheets specified in Table 2 and cut into shapes respectively shown in FIGS. 4, 8, 10 and 12 using combinations specified in Table 3-2 are wrapped consecutively so as to prepare shafts respectively based on the structures in Examples 1~4 and by employing the same procedures as in Examples 1~4. In Examples 6~9, tungsten prepreg (TP013GE3417, made by Mitsubishi Rayon Co., Ltd.) is laminated to have a weight that is 5% of the shaft weight in a position 150 mm from the butt end toward the tip end. As a result, since the balance point of each shaft is set to be at least 54%, an increase in club head weight is expected to contribute to a longer carry distance and improved ball flight patterns. Tables 5-2 and 6-2 show properties and bending strengths of each shaft estimated from the conditions set for Examples 6~9.

Comparative Examples 4~7

In Comparative Examples 4~7, prepreg sheets specified in Table 2 and cut into shapes shown in FIGS. 4, 8, 10 and 12 using combinations specified in Table 3-2 are wrapped consecutively so as to prepare shafts respectively based on the structures in Examples 1~4 and by employing the same procedures as in Examples 1~4. In Comparative Examples 4~7, tungsten prepreg (TP013GE3417, made by Mitsubishi Rayon) is laminated to have a weight that is 35% of the shaft weight in a position 150 mm from the butt end toward the tip end. By so setting, a longer carry distance is expected the same as in Examples 6~9. However, since the thickness of a straight layer or the number of straight layers is reduced to sustain the entire original weight, the shaft is soft. Therefore, ball flight patterns are likely to be less controlled.

Tables 5-2 and 6-2 show properties and bending strengths of each shaft estimated from the conditions set for Comparative Examples 4~7.

Examples 10~13

In Examples 10~13, prepreg sheets specified in Table 2 and cut into shapes shown in FIGS. 4, 8, 10 and 12 using combinations specified in Table 3-2 are wrapped consecutively so as to prepare shafts respectively based on the structures in Examples 1~4 and by employing the same procedures as in Examples 1~4. In Examples 10~13, tungsten prepreg (TP013GE3417, made by Mitsubishi Rayon) is laminated to have a weight that is 30% of the shaft weight in a position 150 mm from the butt end toward the tip end. Since the balance point of each shaft is set to be high, an increase in club head weight is expected to contribute to a longer carry distance and improved ball flight patterns.

Tables 5-2 and 6-2 show properties and bending strengths of each shaft estimated from the conditions of Examples 10~13.

TABLE 1

|  | Unit | Mandrel 10 | Mandrel 11 | Mandrel 12 | Mandrel 13 |
|---|---|---|---|---|---|
| L1 | mm | 850 | 950 | 950 | 900 |
| L2 | mm | 650 | 550 | 550 | 600 |
| L3 | mm | 1500 | 1500 | 1500 | 1500 |
| P1 | mm | 4.85 | 4.00 | 5.25 | 6.20 |
| P2 | mm | 14.30 | 14.10 | 14.35 | 14.10 |
| P3 | mm | 14.30 | 14.10 | 14.35 | 14.10 |
| Tapering degree |  | 11.12/1000 | 10.63/1000 | 9.58/1000 | 8.78/1000 |

TABLE 2

| Item | Product name |
|---|---|
| Prepreg 1 | MRA350C075S: Mitsubishi Rayon Co., Ltd. (CF tensile elasticity: 325 GPa, CF tensile strength: 7000 MPa, CF basis weight: 75 g/m$^2$, resin content: 25%, prepreg thickness: 0.063 mm) |
| Prepreg 2 | MRA350J050S: Mitsubishi Rayon Co., Ltd. (CF tensile elasticity: 290 GPa, CF tensile strength: 5680 MPa, CF basis weight: 50 g/m$^2$, resin content: 33%, prepreg thickness: 0.050 mm) |
| Prepreg 3 | TR350E125S: Mitsubishi Rayon Co., Ltd. (CF tensile elasticity: 240 GPa, CF tensile strength: 4900 MPa, CF basis weight: 125 g/m$^2$, resin content: 30%, prepreg thickness: 0.113 mm) |
| Prepreg 4 | MRX350C075R: Mitsubishi Rayon Co., Ltd. (CF tensile elasticity: 290 GPa, CF tensile strength: 5680 MPa, CF basis weight: 75 g/m$^2$, resin content: 25%, prepreg thickness: 0.063 mm) |
| Prepreg 5 | MR350K020S: Mitsubishi Rayon Co., Ltd. (CF tensile elasticity: 290 GPa, CF tensile strength: 5680 MPa, CF basis weight: 20 g/m$^2$, resin content: 34%, prepreg thickness: 0.020 mm) |
| Prepreg 6 | MRA350C100S: Mitsubishi Rayon Co., Ltd. (CF tensile elasticity: 325 GPa, CF tensile strength: 7000 MPa, CF basis weight: 100 g/m$^2$, resin content: 25%, prepreg thickness: 0.084 mm) |
| Prepreg 7 | MRA350C125S: Mitsubishi Rayon Co., Ltd. (CF tensile elasticity: 325 GPa, CF tensile strength: 7000 MPa, CF basis weight: 125 g/m$^2$, resin content: 25%, prepreg thickness: 0.106 mm) |
| Prepreg 8 | MRX350C100R: Mitsubishi Rayon Co., Ltd. (CF tensile elasticity: 290 GPa, CF tensile strength: 5680 MPa, CF basis weight: 100 g/m$^2$, resin content: 25%, prepreg thickness: 0.084 mm) |
| Prepreg 9 | MRX350C125R: Mitsubishi Rayon Co., Ltd. (CF tensile elasticity: 290 GPa, CF tensile strength: 5680 MPa, CF basis weight: 125 g/m$^2$, resin content: 25%, prepreg thickness: 0.106 mm) |
| Prepreg 10 | MR350C050S: Mitsubishi Rayon Co., Ltd. (CF tensile elasticity: 290 GPa, CF tensile strength: 5680 MPa, CF basis weight: 50 g/m$^2$, resin content: 25%, prepreg thickness: 0.050 mm) |
| Prepreg 11 | TP013GE3417: Mitsubishi Rayon Co., Ltd. (prepreg basis weight: 700 g/m$^2$, prepreg thickness: 0.090 mm) |

TABLE 3-1

|  | Example 1 | Comp. Example 1 | Example 2 | Comp. Example 2 | Example 3 | Comp. Example 3 | Example 4 | Example 5 |
|---|---|---|---|---|---|---|---|---|
| Pattern 1 | 1 | 4 | 4 | 4 | 4 | 4 | 10 | 1 |
| Pattern 2 | 2 | 2 | 5 | 5 | 2 | 2 | 5 | 5 |
| Pattern 3 | 1 | 4 | 6 | 8 | 2 | 2 | 5 | 5 |
| Pattern 4 | 1 | 4 | 6 | 8 | 5 | 5 | 5 | 2 |
| Pattern 5 | 1 | 4 | 7 | 9 | 1 | 4 | 1 | 1 |
| Pattern 6 | 3 | 3 | 3 | 3 | 2 | 2 | 2 | 2 |
| Pattern 7 | 3 | 3 | 3 | 3 | 1 | 5 | 1 | 1 |
| Pattern 8 | — | — | — | — | 2 | 2 | 10 | 2 |
| Pattern 9 | — | — | — | — | 1 | 5 | 1 | 1 |
| Pattern 10 | — | — | — | — | 3 | 3 | 1 | 1 |
| Pattern 11 | — | — | — | — | 3 | 3 | 3 | 3 |
| Pattern 12 | — | — | — | — | — | — | — | — |

TABLE 3-2

|  | Example 6 | Example 7 | Example 8 | Example 9 | Comp. Example 4 | Comp. Example 5 | Comp. Example 6 | Comp. Example 7 | Example 10 | Example 11 | Example 12 | Example 13 |
|---|---|---|---|---|---|---|---|---|---|---|---|---|
| Pattern 1 | 1 | 4 | 4 | 10 | 1 | 4 | 4 | 10 | 1 | 4 | 4 | 10 |
| Pattern 2 | 2 | 5 | 2 | 5 | 2 | 5 | 2 | 5 | 2 | 5 | 2 | 5 |
| Pattern 3 | 1 | 6 | 2 | 5 | 1 | 6 | 2 | 5 | 1 | 6 | 2 | 5 |
| Pattern 4 | 1 | 6 | 5 | 5 | 1 | 6 | 5 | 5 | 1 | 6 | 5 | 5 |
| Pattern 5 | 1 | 7 | 1 | 1 | — | 1 | 1 | 1 | 1 | 7 | 1 | 1 |
| Pattern 6 | 3 | 3 | 2 | 2 | 3 | 3 | 2 | 2 | 3 | 3 | 2 | 2 |
| Pattern 7 | 3 | 3 | 1 | 1 | 3 | 1 | 1 | 1 | 4 | 4 | 1 | 1 |
| Pattern 8 | 11 | 11 | 2 | 10 | 11 | 11 | 2 | 10 | 11 | 11 | 2 | 10 |
| Pattern 9 | — | — | 1 | 1 | — | — | — | — | — | — | 1 | 1 |
| Pattern 10 | — | — | 3 | 1 | — | — | 3 | 1 | — | — | 3 | 1 |
| Pattern 11 | — | — | 3 | 3 | — | — | 3 | 3 | — | — | 4 | 4 |
| Pattern 12 | — | — | 11 | 11 | — | — | 11 | 11 | — | — | 11 | 11 |

TABLE 4-1

|  | (Unit) | Example 1 | Comp. Example 1 | Example 2 | Comp. Example 2 | Example 3 | Comp. Example 3 | Example 4 | Example 5 |
|---|---|---|---|---|---|---|---|---|---|
| x | mm | 9 | 9 | 8 | 8 | 10 | 10 | 11 | 11 |
| y | mm | 22 | 22 | 22 | 22 | 23 | 23 | 22 | 22 |
| α1 | mm | 55 | 55 | 57 | 57 | 25 | 25 | 27 | 31 |
| β1 | mm | 130 | 130 | 117 | 117 | 57 | 57 | 55 | 69 |
| α2 | mm | 20 | 20 | 20 | 20 | 21 | 21 | 22 | 22 |
| β2 | mm | 47 | 47 | 46 | 46 | 28 | 28 | 29 | 29 |
| α3 | mm | 20 | 20 | 20 | 20 | 21 | 21 | 22 | 22 |
| β3 | mm | 47 | 47 | 46 | 46 | 28 | 28 | 29 | 29 |
| α4 | mm | 42 | 42 | 20 | 20 | 21 | 21 | 22 | 23 |
| β4 | mm | 96 | 96 | 47 | 47 | 46 | 46 | 45 | 46 |
| α5 | mm | 22 | 22 | 42 | 42 | 21 | 21 | 22 | 23 |
| β5 | mm | 49 | 49 | 96 | 96 | 46 | 46 | 45 | 46 |
| α6 | mm | 45 | 45 | 45 | 45 | 22 | 22 | 23 | 24 |
| β6 | mm | 69 | 69 | 67 | 67 | 47 | 47 | 46 | 47 |
| α7 | mm | 135 | 135 | 135 | 135 | 22 | 22 | 23 | 24 |
| β7 | mm | — | — | — | — | 47 | 47 | 46 | 47 |
| α8 | mm | — | — | — | — | 23 | 23 | 23 | 24 |
| β8 | mm | — | — | — | — | 48 | 48 | 47 | 47 |
| α9 | mm | — | — | — | — | 23 | 23 | 23 | 24 |
| β9 | mm | — | — | — | — | 48 | 48 | 47 | 47 |
| α10 | mm | — | — | — | — | 23 | 23 | 24 | 25 |
| β10 | mm | — | — | — | — | 31 | 31 | 31 | 31 |
| α11 | mm | — | — | — | — | 115 | 115 | 110 | 90 |
| β11 | mm | — | — | — | — | — | — | — | — |
| α12 | mm | — | — | — | — | — | — | — | — |
| β12 | mm | — | — | — | — | — | — | — | — |
| γ1 | mm | 1190 | 1190 | 1190 | 1190 | 1190 | 1190 | 1190 | 1190 |
| γ2 | mm | 410 | 410 | 370 | 370 | 350 | 350 | 350 | 350 |
| γ3 | mm | 350 | 350 | 350 | 350 | 250 | 250 | 240 | 240 |
| γ4 | mm | 200 | 200 | 200 | 200 | 150 | 150 | 180 | 180 |
| γ5 | mm | 115 | 115 | 120 | 120 | 250 | 250 | 250 | 250 |
| γ6 | mm | — | — | — | — | 150 | 150 | 190 | 190 |

TABLE 4-1-continued

| (Unit) | | Example 1 | Comp. Example 1 | Example 2 | Comp. Example 2 | Example 3 | Comp. Example 3 | Example 4 | Example 5 |
|---|---|---|---|---|---|---|---|---|---|
| γ 7 | mm | — | — | — | — | 110 | 110 | 110 | 90 |
| γ 8 | mm | — | — | — | — | — | — | — | — |

TABLE 4-2

| (Unit) | | Example 1 | Comp. Example 1 | Example 2 | Comp. Example 2 | Example 3 | Comp. Example 3 | Example 4 | Example 5 |
|---|---|---|---|---|---|---|---|---|---|
| x | mm | 9 | 9 | 8 | 8 | 10 | 10 | 11 | 11 |
| y | mm | 22 | 22 | 22 | 22 | 23 | 23 | 22 | 22 |
| α 1 | mm | 55 | 55 | 57 | 57 | 25 | 25 | 27 | 31 |
| β 1 | mm | 130 | 130 | 117 | 117 | 57 | 57 | 55 | 69 |
| α 2 | mm | 20 | 20 | 20 | 20 | 21 | 21 | 22 | 22 |
| β 2 | mm | 47 | 47 | 46 | 46 | 28 | 28 | 29 | 29 |
| α 3 | mm | 20 | 20 | 20 | 20 | 21 | 21 | 22 | 22 |
| β 3 | mm | 47 | 47 | 46 | 46 | 28 | 28 | 29 | 29 |
| α 4 | mm | 42 | 42 | 20 | 20 | 21 | 21 | 22 | 23 |
| β 4 | mm | 96 | 96 | 47 | 47 | 46 | 46 | 45 | 46 |
| α 5 | mm | 22 | 22 | 42 | 42 | 21 | 21 | 22 | 23 |
| β 5 | mm | 49 | 49 | 96 | 96 | 46 | 46 | 45 | 46 |
| α 6 | mm | 45 | 45 | 45 | 45 | 22 | 22 | 23 | 24 |
| β 6 | mm | 69 | 69 | 67 | 67 | 47 | 47 | 46 | 47 |
| α 7 | mm | 135 | 135 | 135 | 135 | 22 | 22 | 23 | 24 |
| β 7 | mm | — | — | — | — | 47 | 47 | 46 | 47 |
| α 8 | mm | — | — | — | — | 23 | 23 | 23 | 24 |
| β 8 | mm | — | — | — | — | 48 | 48 | 47 | 47 |
| α 9 | mm | — | — | — | — | 23 | 23 | 23 | 24 |
| β 9 | mm | — | — | — | — | 48 | 48 | 47 | 47 |
| α 10 | mm | — | — | — | — | 23 | 23 | 24 | 25 |
| β 10 | mm | — | — | — | — | 31 | 31 | 31 | 31 |
| α 11 | mm | — | — | — | — | 115 | 115 | 110 | 90 |
| β 11 | mm | — | — | — | — | — | — | — | — |
| α 12 | mm | — | — | — | — | — | — | — | — |
| β 12 | mm | — | — | — | — | — | — | — | — |
| γ 1 | mm | 1190 | 1190 | 1190 | 1190 | 1190 | 1190 | 1190 | 1190 |
| γ 2 | mm | 410 | 410 | 370 | 370 | 350 | 350 | 350 | 350 |
| γ 3 | mm | 350 | 350 | 350 | 350 | 250 | 250 | 240 | 240 |
| γ 4 | mm | 200 | 200 | 200 | 200 | 150 | 150 | 180 | 180 |
| γ 5 | mm | 115 | 115 | 120 | 120 | 250 | 250 | 250 | 250 |
| γ 6 | mm | — | — | — | — | 150 | 150 | 190 | 190 |
| γ 7 | mm | — | — | — | — | 110 | 110 | 110 | 90 |
| γ 8 | mm | — | — | — | — | — | — | — | — |

TABLE 5-1

| | Entire length L [mm] | Weight W [g] | Outer dia. 10 mm from tip end [mm] | Outer dia. 25 mm from butt end [mm] | Frequency [cpm] | Cantilever bending displacement D [mm] | Bending stiffness Elb [N·m²] | Bending stiffness Elc [N·m²] | Kick point Kp [%] |
|---|---|---|---|---|---|---|---|---|---|
| Example 1 | 1168 | 45.1 | 8.51 | 15.54 | 260 | 162 | 35.1 | 56.1 | 43.7 |
| Comp. Example 1 | 1168 | 45.7 | 8.51 | 15.58 | 252 | 176 | 31.8 | 50.4 | 43.6 |
| Example 2 | 1168 | 50.1 | 8.51 | 15.49 | 292 | 128 | 42.8 | 68.2 | 43.5 |
| Comp. Example 2 | 1168 | 51.0 | 8.51 | 15.54 | 282 | 138 | 40.1 | 65.8 | 43.5 |
| Example 3 | 1168 | 33.5 | 8.51 | 15.26 | 215 | 243 | 22.1 | 36.8 | 43.3 |
| Comp. Example 3 | 1168 | 33.5 | 8.51 | 15.30 | 205 | 267 | 20.8 | 33.8 | 43.0 |
| Example 4 | 1168 | 29.3 | 8.51 | 14.93 | 205 | 273 | 21.0 | 31.1 | 43.8 |
| Example 5 | 1168 | 37.1 | 8.51 | 15.15 | 225 | 228 | 26.1 | 42.9 | 43.9 |

TABLE 5-1-continued

|  | Balance point Bp [%] | Torque Tq [°] | Average carry distance of 3 testers [yrd] | Average horizontal shift of 3 testers [yrd] | Value of formula (1)' | Value of formula (2)' |
|---|---|---|---|---|---|---|
| Example 1 | 52.8 | 5.3 | 234.0 | 11.1 | 500 | 45.1 |
| Comp. Example 1 | 52.5 | 5.7 | 229.7 | 24.5 | 519 | 45.7 |
| Example 2 | 52.6 | 6.0 | 199.8 | 9.2 | 504 | 50.1 |
| Comp. Example 2 | 52.7 | 6.1 | 196.4 | 19.9 | 521 | 51.0 |
| Example 3 | 52.6 | 9.8 | 200.6 | 8.0 | 494 | 33.5 |
| Comp. Example 3 | 52.7 | 9.9 | 197.7 | 19.7 | 518 | 33.5 |
| Example 4 | 53.0 | 11.9 | 205.3 | 8.5 | 493 | 29.3 |
| Example 5 | 54.1 | 7.9 | 204.9 | 9.5 | 506 | 37.1 |

TABLE 5-2

|  | Entire length L [mm] | Weight W [g] | Outer dia. 10 mm from tip end [mm] | Outer dia. 25 mm from butt end [mm] | Frequency [cpm] | Cantilever bending displacement D [mm] | Bending stiffness Elb [N·m²] | Bending stiffness Elc [N·m²] | Kick point Kp [%] |
|---|---|---|---|---|---|---|---|---|---|
| Example 6 | 1168 | 46.8 | 8.51 | 15.62 | 260 | 162 | 35.1 | 56.1 | 43.7 |
| Example 7 | 1168 | 51.5 | 8.51 | 15.53 | 292 | 128 | 42.8 | 68.2 | 43.5 |
| Example 8 | 1168 | 35.0 | 8.51 | 15.30 | 215 | 243 | 22.1 | 36.8 | 43.3 |
| Example 9 | 1168 | 29.7 | 8.51 | 14.98 | 205 | 273 | 21.0 | 31.1 | 43.8 |
| Comp. Example 4 | 1168 | 45.6 | 8.51 | 15.62 | 230 | 232 | 26.3 | 43.8 | 43.7 |
| Comp. Example 5 | 1168 | 50.5 | 8.51 | 15.53 | 262 | 160 | 35.1 | 56.5 | 43.5 |
| Comp. Example 6 | 1168 | 34.0 | 8.51 | 15.30 | 185 | 308 | 12.0 | 12.7 | 43.3 |
| Comp. Example 7 | 1168 | 29.7 | 8.51 | 14.98 | 175 | 315 | 10.0 | 10.5 | 43.8 |
| Example 10 | 1168 | 45.6 | 8.51 | 15.62 | 250 | 173 | 35.1 | 56.1 | 43.7 |
| Example 11 | 1168 | 50.5 | 8.51 | 15.53 | 270 | 135 | 42.8 | 68.2 | 43.5 |
| Example 12 | 1168 | 34.0 | 8.51 | 15.30 | 210 | 260 | 22.1 | 36.8 | 43.3 |
| Example 13 | 1168 | 29.7 | 8.51 | 14.98 | 195 | 292 | 21.0 | 31.1 | 43.8 |

|  | Balance point Bp [%] | Torque Tq [°] | Average carry distance of 3 testers [yrd] | Average horizontal shift of 3 testers [yrd] | Value of formula (1)' | Value of formula (2)' |
|---|---|---|---|---|---|---|
| Example 6 | 55.2 | 5.3 | 235.8 | 11.5 | 513 | 46.8 |
| Example 7 | 56.0 | 6.0 | 232.0 | 9.8 | 514 | 51.5 |
| Example 8 | 54.5 | 9.8 | 200.9 | 8.4 | 506 | 35.0 |
| Example 9 | 54.0 | 11.9 | 197.2 | 8.9 | 496 | 29.7 |
| Comp. Example 4 | 63.0 | 5.3 | 237.9 | 25.8 | 574 | 45.6 |
| Comp. Example 5 | 62.7 | 6.0 | 234.1 | 21.3 | 539 | 50.5 |
| Comp. Example 6 | 62.3 | 9.8 | 202.8 | 20.3 | 563 | 34.0 |
| Comp. Example 7 | 62.1 | 11.9 | 199.3 | 19.8 | 538 | 29.7 |
| Example 10 | 60.1 | 7.3 | 236.7 | 12.8 | 515 | 45.6 |
| Example 11 | 61.0 | 8.0 | 233.9 | 10.8 | 514 | 50.5 |
| Example 12 | 59.4 | 11.8 | 202.1 | 9.8 | 515 | 34.0 |
| Example 13 | 58.2 | 13.9 | 198.0 | 9.9 | 515 | 29.7 |

TABLE 6-1

| | Load point | | | |
|---|---|---|---|---|
| | T (90 mm from tip end) [N] | A (175 mm from tip end) [N] | B (525 mm from tip end) [N] | C (175 mm from butt end) [N] |
| Example 1 | 1536 | 959 | 644 | 745 |
| Comp. Example 1 | 1651 | 911 | 651 | 739 |
| Example 2 | 1994 | 1091 | 688 | 665 |
| Comp. Example 2 | 1580 | 1036 | 734 | 749 |
| Example 3 | 919 | 476 | 456 | 454 |
| Comp. Example 3 | 936 | 409 | 515 | 513 |
| Example 4 | 907 | 471 | 423 | 425 |
| Example 5 | 1206 | 645 | 567 | 581 |

TABLE 6-2

| | Load point | | | |
|---|---|---|---|---|
| | T (90 mm from tip end) [N] | A (175 mm from tip end) [N] | B (525 mm from tip end) [N] | C (175 mm from butt end) [N] |
| Example 6 | 1482 | 939 | 645 | 851 |
| Example 7 | 1858 | 954 | 671 | 745 |
| Example 8 | 902 | 453 | 451 | 505 |
| Example 9 | 854 | 432 | 428 | 493 |
| Comp. Example 4 | 1152 | 888 | 753 | 1099 |
| Comp. Example 5 | 1201 | 916 | 782 | 1158 |
| Comp. Example 6 | 857 | 441 | 518 | 708 |
| Comp. Example 7 | 812 | 412 | 520 | 695 |
| Example 10 | 1241 | 911 | 741 | 997 |
| Example 11 | 1400 | 922 | 766 | 1122 |
| Example 12 | 901 | 448 | 501 | 682 |
| Example 13 | 843 | 440 | 503 | 654 |

As is clear from the above results shown in each of the Examples, golf club shafts made of fiber-reinforced plastic according to the present invention exhibit a longer carry distance and excellent ball flight patterns without being affected by head speeds of individual golfers.

INDUSTRIAL APPLICABILITY

Since the golf club shafts made of fiber-reinforced plastic related to the present invention have high bending stiffness despite their lightweight features, they are capable of achieving both a longer carry distance and excellent ball flight patterns regardless of the skills of a golfer.

DESCRIPTION OF NUMERICAL REFERENCES

10~13 mandrel
20 apparatus for three-point bending testing
21 support member
22 load member
23 load measuring member
T load point

What is claimed is:

1. A golf club shaft configured to have a plurality of fiber-reinforced plastic layers comprising resin and a fiber material, the golf club shaft comprising:
a straight layer comprising the fiber material disposed at an orientation angle of −5 to +5 degrees relative to the longitudinal direction of the shaft;
a bias layer formed with an angle layer comprising the fiber material disposed at an orientation angle of −20 to −75 degrees relative to the longitudinal direction of the shaft and another angle layer comprising the fiber material disposed at an orientation angle of +20 to +75 degrees relative to the longitudinal direction of the shaft;
a smaller-diameter tip end on one end; and
a larger-diameter butt end on the other end,
wherein formula (1) below is satisfied when the length of the golf club shaft is set as "L" (mm), the weight as "W" (g), and the displacement as "D" (mm) that is observed when a cantilever bending test is conducted by following: a point 920 mm from the tip end of the shaft is supported from beneath, a point 150 mm toward the butt end from that point is supported from above, a load of 3.0 kgf is exerted on a point 10 mm from the tip end, and the displacement of the tip end is observed as the displacement (D), $$455 \leq D + 7.5 \times W \times (1168/L) \leq 515 \quad (1)$$

wherein the golf club shaft is further comprising at least one fiber-reinforced plastic layer containing the fiber material with an elastic modulus of 300 to 460 GPa and a tensile strength of 5500 to 8500 MPa.

2. The golf club shaft according to claim 1, wherein formula (2) below is satisfied when the length of the golf club shaft is set as "L" (mm) and the weight as "W" (g):

$$25 \leq W \times (1168/L) \leq 57 \quad (2).$$

3. The golf club shaft according to claim 1, wherein formulas (3) and (4) below are satisfied when the bending stiffness at a portion 525 mm from the tip end of the shaft is set as "EIb" (N·m$^2$) and the bending stiffness at a portion 175 mm from the butt end of the shaft is set as "EIc" (N·m$^2$):

$$21 \leq EIb \leq 50 \quad (3)$$

$$31 \leq EIc \leq 70 \quad (4).$$

4. The golf club shaft according to claim 1, comprising a plurality of fiber-reinforced plastic layer comprising the fiber material with an elastic modulus of 300 to 460 GPa and a tensile strength of 5500 to 8500 MPa.

5. The golf club shaft according to claim 1, comprising at least one fiber-reinforced plastic layer comprising the fiber material with an elastic modulus of 300 to 460 GPa and a tensile strength of 5500 to 8500 MPa among the fiber-reinforced plastic layers arranged in a region located at 30% of the entire shaft length from the tip end in the longitudinal direction of the shaft.

6. The golf club shaft according to claim 1, comprising at least one fiber-reinforced plastic layer comprising the fiber material with an elastic modulus of 300 to 460 GPa and a tensile strength of 5500 to 8500 MPa among the fiber-reinforced plastic layers comprising the fiber material disposed at an orientation angle of −5 to +5 degrees in the longitudinal direction of the shaft.

7. The golf club shaft according to claim 1, wherein formula (5) below is satisfied when the distance from the tip end to the gravity center of the shaft is set as "Lg" (mm) and the entire length of the shaft is set as "Ls" (mm):

$$54 \leq (Lg/Ls) \times 100 \leq 62 \quad (5).$$

8. The golf club shaft according to claim 1, comprising a weight-adjustment layer "Wp" located on the butt-end side from the center of the shaft, wherein the weight-adjustment layer "Wp" is set to be 5 to 30% of the entire weight of the shaft.

9. The golf club shaft according to claim 1, wherein formula (7) below is satisfied when the torque of the shaft is set as "Tq" (degrees):

$$4 \leq Tq \leq 12 \tag{7}$$

10. The golf club shaft according to claim 1, comprising all of the fiber-reinforced plastic layer containing the fiber material with an elastic modulus of 300 to 460 GPa and a tensile strength of 5500 to 8500 MPa among the fiber-reinforced plastic layers containing the fiber material disposed at an orientation angle of −5 to +5 degrees in the longitudinal direction of the shaft.

* * * * *